(12) United States Patent
Abe et al.

(10) Patent No.: US 7,946,407 B2
(45) Date of Patent: May 24, 2011

(54) VALUE MEDIUM PROCESSING APPARATUS

(75) Inventors: Hiroshi Abe, Saitama (JP); Yoshinobu Tanaka, Saitama (JP)

(73) Assignee: Asahi Seiko Co., Ltd., Tokyo (JP)

( * ) Notice: Subject to any disclaimer, the term of this patent is extended or adjusted under 35 U.S.C. 154(b) by 0 days.

(21) Appl. No.: 12/370,889

(22) Filed: Feb. 13, 2009

(65) Prior Publication Data
US 2009/0205927 A1 Aug. 20, 2009

(30) Foreign Application Priority Data

Feb. 14, 2008 (JP) ................................. 2008-033734

(51) Int. Cl.
G07F 7/02 (2006.01)
G07F 7/10 (2006.01)

(52) U.S. Cl. ........ 194/210; 194/211; 194/212; 194/213; 194/205; 194/346; 713/172; 705/65

(58) Field of Classification Search .......... 194/210–213, 194/346, 352; 705/65–69; 713/172–174; 726/9; 380/229
See application file for complete search history.

(56) References Cited

U.S. PATENT DOCUMENTS

| | | | | |
|---|---|---|---|---|
| 5,871,076 A * | 2/1999 | Anello et al. | ................. | 194/347 |
| 6,260,686 B1 * | 7/2001 | Rigo | ............................ | 194/210 |
| 6,293,385 B1 * | 9/2001 | Hayashi et al. | ............... | 194/317 |
| 6,550,600 B2 * | 4/2003 | Faes et al. | ..................... | 194/203 |
| 6,786,408 B2 * | 9/2004 | Yamagishi et al. | ........... | 235/451 |
| 2008/0060908 A1 * | 3/2008 | Abe et al. | ...................... | 194/302 |
| 2008/0299886 A1 | 12/2008 | Enomoto | | |

FOREIGN PATENT DOCUMENTS

| | | |
|---|---|---|
| JP | 2002-063623 | 2/2002 |
| JP | 2005-293097 | 10/2005 |
| JP | 2006-189986 | 7/2006 |

OTHER PUBLICATIONS

English language Abstract of JP 2006-189986, Jul. 20, 2006.
English language Abstract of JP 2005-293097, Oct. 20, 2005.
English language Abstract of JP 2002-063623, Feb. 28, 2002.

* cited by examiner

*Primary Examiner* — Jeffrey A Shapiro
(74) *Attorney, Agent, or Firm* — Greenblum & Bernstein P.L.C.

(57) ABSTRACT

A value medium processing apparatus includes a common rolling path on which the IC coin and the coin roll, a coin characteristic detector provided on a side portion of the common rolling path, an IC coin characteristic detector configured to detect IC coin rolling on the common rolling path; an inlet to a coin path on which the coin rolls and an inlet to an IC coin path on which the IC coin rolls, a medium sorter provided upstream of the coin inlet and the IC coin inlet; a communicator provided on a side of the IC coin path and communicating with the IC coin; and a controller actuating the medium sorter based on one of characteristic information from the coin characteristic detector and information from the IC coin characteristic detector, and switching the common rolling path to one of the IC coin path and the coin path.

8 Claims, 17 Drawing Sheets

VALUE MEDIUM PROCESSING APPARATUS

CROSS-REFERENCE TO RELATED APPLICATIONS

The present application claims priority under 35 U.S.C. §119 of Japanese Application No. 2008-033734 filed on Feb. 14, 2008, the disclosure of which is expressly incorporated by reference herein in its entirety.

BACKGROUND OF THE INVENTION

1. Field of the Invention

The present invention relates to a value medium processing apparatus capable of determining authenticity of a coin and of writing or reading value information to or from a coin-shaped electric value information storage medium (IC coin). Specifically, the present invention relates to a value medium processing apparatus capable of sorting a coin and an IC coin inserted into a common inlet and of storing or returning the sorted coin and IC coin. More specifically, the present invention relates to a value medium processing apparatus for a coin and an IC coin capable of sorting a coin and an IC coin inserted into a common inlet, of storing or returning the sorted coin and IC coin, and of fitting into a de-facto standard size. The value medium processing apparatus according to the present invention can be used for coin-operated game machines, vending machines, and the like. In the present specification, the term "coin" collectively refers to hard currencies, medals and tokens for game machines, and the like; and the term "IC coin" collectively refers to coin-shaped electric value storage media.

2. Description of Related Art

As a first conventional technology, a type sorting mechanism is known, in which a common inlet and a vertically long path therebehind are provided, the inlet having a vertical slit and being capable of receiving both an IC coin and a coin, the vertically long path having a same width as that of the inlet; an obliquely downward coin path is provided in a central portion in a width direction on a bottom surface of the vertically long path, the coin path having a width that can accommodate the coin alone and having a relatively high gradient; a coin receiving slit having a width through which the coin alone can drop is provided ahead of the coin path; obliquely downward shoulders having a lower gradient are provided on both sides of the coin path; and, an IC coin receiver is provided further ahead of the coin receiving slit (Refer to Related Art 1, for example). As a second conventional technology, a sorter is known, in which a downwardly oblique coin feeding path is provided extending from a common inlet, and a plurality of shutters are provided on the coin feeding path. The sorter determines the size of an inserted coin and selectively opens the shutters, and thereby sorts an IC coin and an coin into corresponding processors (Refer to Related Art 2, for example). As a third conventional technology, a coin processing apparatus is known having a coin inlet into which a coin is inserted; a rolling path on which the coin inserted from the coin inlet rolls in a diameter direction; and a coin processor that processes the coin rolling on the rolling path. A sorter and a medium processor are provided in the rolling path, the sorter sorting the coin from a contactless IC medium having a circular plate shape inserted from the coin inlet, the medium processor processing the contactless IC medium sorted by the sorter. The sorter is a weight sorter, which sorts the contactless IC medium to be introduced to the medium processor. Further, as a fourth conventional technology, a coin processing apparatus is known, in which the sorter of the third conventional technology is provided with a stopper that temporarily stops a contactless IC medium having a larger diameter than that of a coin. The medium processor then processes the contactless IC medium temporarily stopped by the stopper (Refer to Related Art 3, for example).

[Related Art 1] Japanese Patent Laid-open Publication No. 2006-189986 (FIGS. 1 to 3; Pages 2 to 4)

[Related Art 2] Japanese Patent Laid-open Publication No. 2005-293097 (FIGS. 2 to 7; Pages 6 to 11)

[Related Art 3] Japanese Patent Laid-open Publication No. 2002-063623 (FIGS. 1 to 3; Pages 1 to 4)

The first conventional technology provides an advantage that allows the coin and the IC coin to be inserted into the same inlet and thus prevents customers from using a wrong inlet. Since the coin is dropped to the coin path by the obliquely downward shoulders having a low gradient, however, the coin, which has inertia force from rolling, may roll on the shoulders, not dropping into the coin path. Thus, the coin may not be sorted. In addition, the coin is sorted while rolling on the IC coin path, and then identified. Therefore, a writer or reader of the IC coin needs to be provided downstream of the path on which the coin rolls, thus causing a problem of an apparatus growing in size. Further, the first conventional technology mechanically determines authenticity of the coin simply based on the thickness, thus incapable of identifying a false coin having a thickness same as that of a true coin. In order to improve accuracy of authenticity determination, a diameter, material, and the like need to be taken into account to determine authenticity. It is thus necessary to provide a determinator subsequent to the coin path, thus causing a problem of an apparatus growing in size. Specifically, it is required that the apparatus fit into a size of conventional coin sorters, in view of ensuring of compatibility with existing coin sorters used in game machines and the like. More specifically, a value medium processing apparatus needs to fit into an international de-facto standard of 3.5 inches in width and length. The first conventional technology, which has the large size problem as described above, thus cannot ensure compatibility.

In the second conventional technology, the IC coin processor and the coin authenticity determinator need to be provided downstream of sorting by the shutters, similar to the first conventional technology. Thus, the second conventional technology cannot achieve the size compatibility with existing apparatuses.

The third conventional technology, which sorts the coin from the IC coin using the weight sorter, is affected by coin insertion speed and thus may wrongly identify the coin as the IC coin. In addition, although a portion extending from the inlet is commonly used, mostly the coin path and the IC coin path need to be provided separately. Thus, the technology cannot achieve the size compatibility with existing apparatuses.

The fourth conventional technology, which performs sorting based on the diameter difference between the coin and the IC coin, does not allow the size of the IC coin to be set freely.

SUMMARY OF THE INVENTION

A first purpose of the present invention is to provide a compact value medium processing apparatus capable of processing an IC coin and a coin. A second purpose of the present invention is to provide a value medium processing apparatus capable of processing an IC coin and a coin and having compatibility with an existing value medium processing apparatus. A third purpose of the present invention is to provide a compact value medium processing apparatus capable of processing an IC coin and a coin at an affordable price.

In order to achieve the purposes above, the value medium processing apparatus according to the present invention is configured as described below. A first aspect of the present invention provides a value medium processing apparatus determining authenticity of a coin and an IC coin inserted into a common inlet so as to sort the coins into a received coin and a returned coin, and communicating with the IC coin so as to sort the IC coin into a received IC coin and a returned IC coin. The value medium processing apparatus includes a common rolling path on which the IC coin and the coin roll, the common rolling path extending from the inlet; a coin characteristic detector provided on a side portion of the common rolling path; an IC coin characteristic detector detecting characteristics of the IC coin rolling on the common rolling path; an inlet to a coin path on which the coin rolls, and an inlet to an IC coin path on which the IC coin rolls, the inlet to the coin path and the inlet to the IC coin path being provided in parallel extending from the common rolling path; a medium sorter provided upstream of the coin inlet and the IC coin inlet; a communicator provided on a side of the IC coin path and communicating with the IC coin; and a controller actuating the medium sorter based on one of characteristic information from the coin characteristic detector and information from the IC coin characteristic detector, and switching the common rolling path to one of the IC coin path and the coin path.

A second aspect of the present invention provides a value medium processing apparatus determining authenticity of a coin and an IC coin inserted into a common inlet so as to sort the coins into a received coin and a returned coin, and communicating with the IC coin so as to sort the IC coin into a received IC coin and a returned IC coin. The value medium processing apparatus includes a common rolling path on which the IC coin and the coin roll, the common rolling path extending from the inlet; a coin characteristic detector provided on a side portion of the common rolling path; a coin inlet to a coin path on which the coin rolls, and an IC coin inlet to an IC coin path on which the IC coin rolls, the coin inlet and the IC coin inlet extending from the common rolling path; an IC coin reservoir provided downstream of the IC coin inlet; a medium sorter provided upstream of the coin inlet and the IC coin inlet; a communicator communicating with the IC coin reserved in the IC coin reservoir; an IC coin sorter provided downstream of the IC coin reservoir; an IC coin storage path and a return path provided downstream of the IC coin sorter; a return sorter provided downstream of the coin inlet; a coin return path and a coin storage path provided downstream of the return sorter; and a controller switching the medium sorter to one of the IC coin path and the coin path, based on one of characteristic information from the characteristic detector and information from the communicator.

A third aspect of the present invention provides the value medium processing apparatus according to the first or second aspect, wherein the medium sorter and the IC coin reservoir are integrally provided, and projected to the coin path so as to receive the IC coin, according to an instruction from the controller.

A fourth aspect of the present invention provides the value medium processing apparatus according to the third aspect, wherein the IC coin reservoir is normally held at a standby position, at which a portion thereof demarcates a portion of the coin path; and only when receiving the IC coin, the IC coin reservoir is projected toward the coin path and returned to the standby position immediately thereafter.

A fifth aspect of the present invention provides the value medium processing apparatus according to the second aspect, wherein the IC coin reservoir includes a storage guide member and a return guide member, which collaborate to form the IC coin reservoir. When the storage guide member is released from the collaboration, the IC coin is guided by the return guide member to the return path. When the return guide member is released from the collaboration, the IC coin is guided by the storage guide member to the IC coin storage path.

A sixth aspect of the present invention provides the value medium processing apparatus according to the first or second aspect, wherein the common rolling path includes a drooping path extending substantially perpendicularly downward from the inlet, and an inclined path extending obliquely downward from the drooping path; a turning path is provided extending from the inclined path so as to turn the coin to a direction opposite to the inclination; the coin path is provided extending obliquely downward from the turning path in a direction opposite to the inclination at a lower portion of the common rolling path; the medium sorter is provided on the turning path; and the return sorter is provided downstream of and adjacent to the medium sorter.

A seventh aspect of the present invention provides the value medium processing apparatus according to the sixth aspect, wherein a denomination sorter is provided downstream of and adjacent to the return sorter.

An eighth aspect of the present invention provides the value medium processing apparatus according to the seventh aspect, wherein the IC coin reservoir includes the storage guide member and the return guide member, which collaborate to form the IC coin reservoir. When the storage guide member is released from the collaboration, the IC coin is guided by the return guide member to the return path. When the return guide member is released from the collaboration, the IC coin is guided by the storage guide member to the IC coin storage path.

A ninth aspect of the present invention provides the value medium processing apparatus according to the eighth aspect, wherein the return path is linked to a lateral side outlet and a downward lower outlet.

Characteristics of a coin inserted into the common inlet are detected by the coin characteristic detector while the coin rolls on the obliquely downward common rolling path. Authenticity of the coin is determined based on the characteristics. Whether or not to be an IC coin is determined by the communicator or the IC coin characteristic detector, such as the coin characteristic detector or the like, while an IC coin rolls on the common rolling path common to coins. Based on the determination result, the controller actuates the medium sorter, such that the coin is sorted to the coin path and that the IC coin is sorted to the IC coin path. Then, based on the authenticity determination, the coin sorted to the coin path is processed accordingly, such as stored, returned, and the like. The IC coin sorted to the IC coin path is processed accordingly through communication via the communicator, and guided to the IC coin storage path or the return path for appropriate processing. As described above, the characteristic information is obtained while the coin and the IC coin roll on the common rolling path, and the coin and the IC coin are determined accordingly. Since the coin and the IC coin roll on the common rolling path in the present invention, the apparatus can be downsized. Further, even when insertion speed is different, the speed is decelerated while the coin and the IC coin roll, and thus rolling speed is averaged. The characteristic information of the coin and the IC coin is obtained when the rolling speed is averaged, and thus the insertion speed hardly have any impact. Thereby, highly precise characteristic information can be obtained, and thus accurate determination can be performed.

In the second aspect of the present invention, characteristics of a coin inserted into the common inlet are detected by the coin characteristic detector while the coin rolls on the obliquely downward common rolling path. Authenticity of the coin is determined based on the characteristics. Characteristics of the IC coin are detected by the communicator or the IC coin characteristic detector, such as, the IC coin characteristic detector or the like, while the IC coin rolls on the common rolling path common to the coin, and then whether or not the IC coin is an IC coin is determined. Based on the determination result, the controller actuates the medium sorter, such that the coin is sorted to the coin path and that the IC coin is sorted to the IC coin path. Then, for the coin sorted to the coin path, the coin sorter is actuated while the coin rolls on the coin path, according to the authenticity determination based on the characteristic information from the coin characteristic detector. When the coin is a true coin, the coin is guided to the coin storage path. When the coin is a false coin, the coin is guided to the return path. The IC coin sorted to the IC coin path is reserved in the IC coin reservoir, processed accordingly through communication with the communicator, and determined to be stored or returned.

Based on the determination, the IC coin sorter is actuated, such that an IC coin to be stored is guided to the storage path and that an IC coin to be returned is returned. As described above, the coin and the IC coin are determined as a coin or an IC coin while rolling on the common rolling path. Since the rolling path is common, the apparatus can be downsized. In addition, the characteristic information of the coin and the IC coin is obtained while the coin and the IC coin roll, the insertion speed thereof hardly has any impact. Thereby, highly precise characteristic information can be obtained, and thus accurate determination can be performed. Further, the coin and the IC coin are stored or returned, based on the authenticity determination and the predetermined process, respectively. Moreover, the coin and IC coin can be processed together. Thus, it is convenient to automatically charge fees.

In the third aspect of the present invention, the medium sorter and the IC coin reservoir are integrally provided. In other words, the IC coin is sorted from the common rolling path and concurrently reserved by the medium sorter. Since the two devices are integrated, space is reduced and thus the apparatus can be downsized.

In the fourth aspect of the present invention, the IC coin reservoir is normally held at the standby position, at which a portion thereof demarcates a portion of the coin path, so as to provide a guide on one side of the coin path provided immediately downstream of the common rolling path. When the IC coin is sorted to the IC coin path, the IC coin reservoir is projected to the coin path. Thereby, the IC coin moving from the common rolling path is received by the IC coin reservoir and reserved therein. Immediately after the IC coin is reserved, the IC coin reservoir is returned to the standby position. When a coin is inserted subsequent to the IC coin, the coin rolls on the common rolling path, moves forward on the coin path as being guided by the IC coin reservoir in the standby position, and then is directed by the coin sorter to the coin storage path or the return path. When an IC coin is inserted subsequent to the IC coin, the IC coin reservoir is not projected to the coin path, since the IC coin reservoir already reserves the IC coin. Thus, the IC coin rolls on the coin path and is returned to the return path, since the IC coin is not to be stored. Thereby, redundant processing of IC coins can be prevented.

In the fifth aspect of the present invention, the IC coin reservoir provides an IC coin reserve chamber, which is formed by the storage guide member and the return guide member so as to surround a lower surface, both sides of an IC coin periphery, and one side surface. The IC coin rolling on the common rolling path proceeds to the reserve recess and is held therein. When the IC coin is returned, the storage guide member is moved, such that the IC coin is guided by the return guide member to the return path. When the IC coin is stored, the return guide member is moved, such that the IC coin is guided by the storage guide member to the IC coin storage path. Since the IC coin reservoir is formed by the return guide member and the storage guide member, the IC coin reservoir can be downsized.

In the sixth aspect of the present invention, the coin path is provided below the common rolling path and has a lateral V shape along with the common rolling path. In other words, a two-level structure is provided including the common rolling path and the coin path therebelow. Further, the IC coin sorter is provided on the V-shaped turning path. Since a behavior of a rolling body is unstable, the coin characteristic detector and the coin sorter, which perform processing while a coin rolls, cannot be provided on the turning path. Providing the IC coin sorter in a commonly-called dead space downsizes the entire apparatus. In order to ensure communication between the IC coin and the communicator, the IC coin needs to be held at rest. Providing the IC coin sorter on the turning path, on which the coin characteristic detector and the sorter cannot be provided, to hold the IC coin achieves a compact apparatus.

In the seventh aspect of the present invention, a true coin sorted by the coin sorter is further sorted into a predetermined denomination by the denomination sorter provided downstream thereof. Thereby, coins can be collected per denomination.

In the eighth aspect of the present invention, the IC coin reservoir is formed by the storage guide member and the return guide member. Selectively moving the members selectively guides the reserved IC coin to the IC coin storage path or the return path. In other words, the storage guide member and the return guide member constitute the coin reservoir and the IC coin sorter, and thereby reduce the size and thus downsizes the entire apparatus.

In the ninth aspect of the present invention, a location of the IC coin outlet of the value medium processing apparatus can be selected from the side or the lower portion.

A value medium processing apparatus determining authenticity of a coin and an IC coin inserted into a common inlet so as to sort the coins into a received coin and a returned coin, and communicating with the IC coin so as to sort the IC coin into a received IC coin and a returned IC coin, includes a common rolling path on which the IC coin and the coin roll, the common rolling path extending from the inlet; a coin characteristic detector provided on a side portion of the common rolling path; a coin inlet to a coin path on which the coin rolls and an IC coin inlet to an IC coin path on which the IC coin rolls, the coin inlet and the IC coin inlet extending from the common rolling path; an IC coin reservoir provided downstream of the IC coin inlet; a sorter provided upstream of the coin inlet and the IC coin inlet; a communicator communicating with the IC coin reserved in the IC coin reservoir; an IC coin sorter provided downstream of the IC coin reservoir; an IC coin storage path and a return path provided downstream of the IC coin sorter; a return sorter provided downstream of the coin inlet; a coin return path and a coin storage path provided downstream of the return sorter; and a controller switching the medium sorter to one of the IC coin path and the coin path, based on one of characteristic information from the coin characteristic detector and information from the communicator. The IC coin reservoir includes a storage guide member and a return guide member, which collaborate to form the IC coin reservoir. The storage guide member and the return guide member are integrally projected to the coin path and returned to a standby position after receiving the IC coin. When the storage guide member is released from the collaboration, the IC coin is guided by the return guide member to the return path. When the return guide member is released from the collaboration, the IC coin is guided by the storage guide member to the IC coin storage path.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 11:
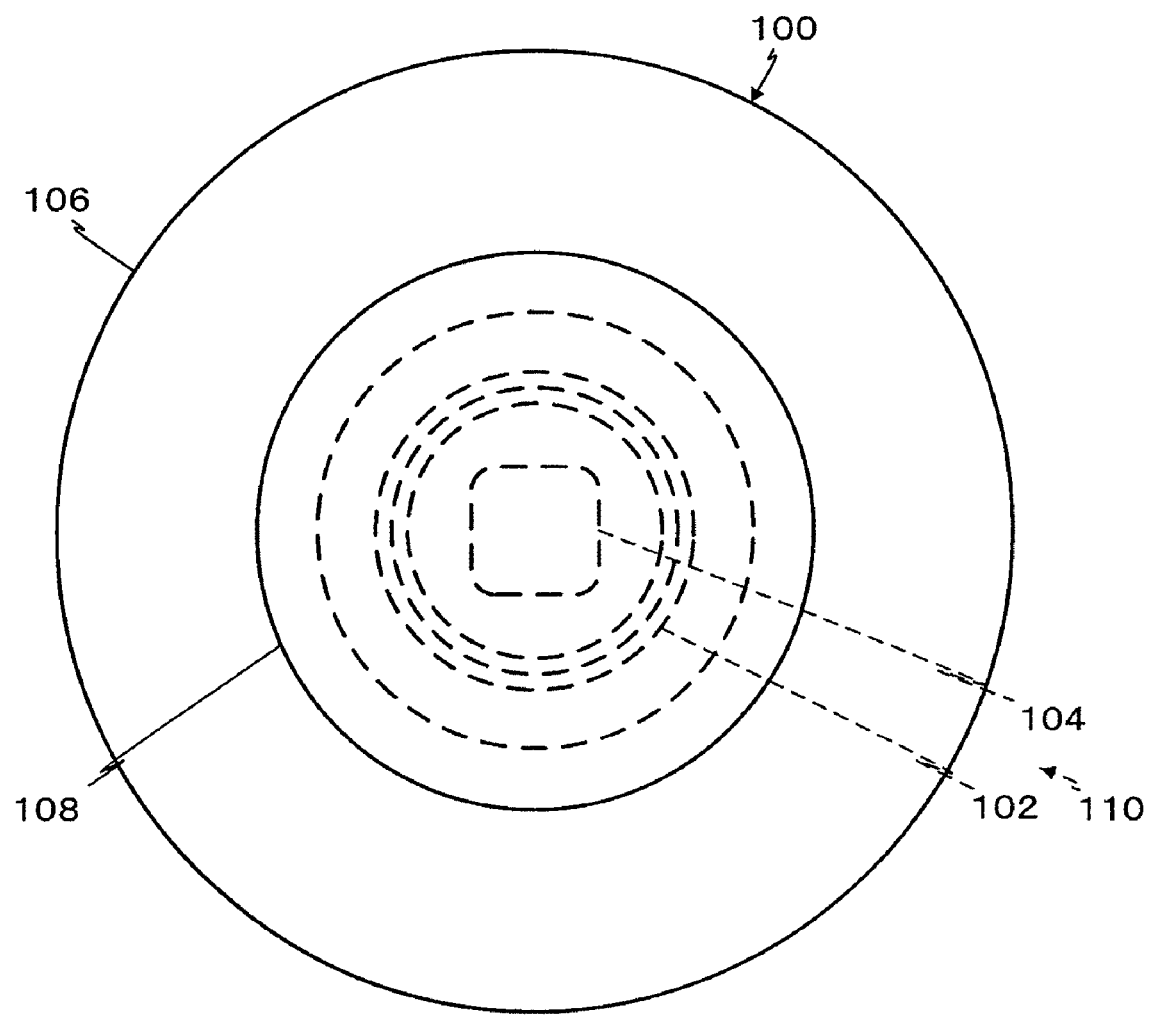
FIG. 11 is a front view of an IC coin suitable for the value medium processing apparatus according to the embodiment.
Figure 12:
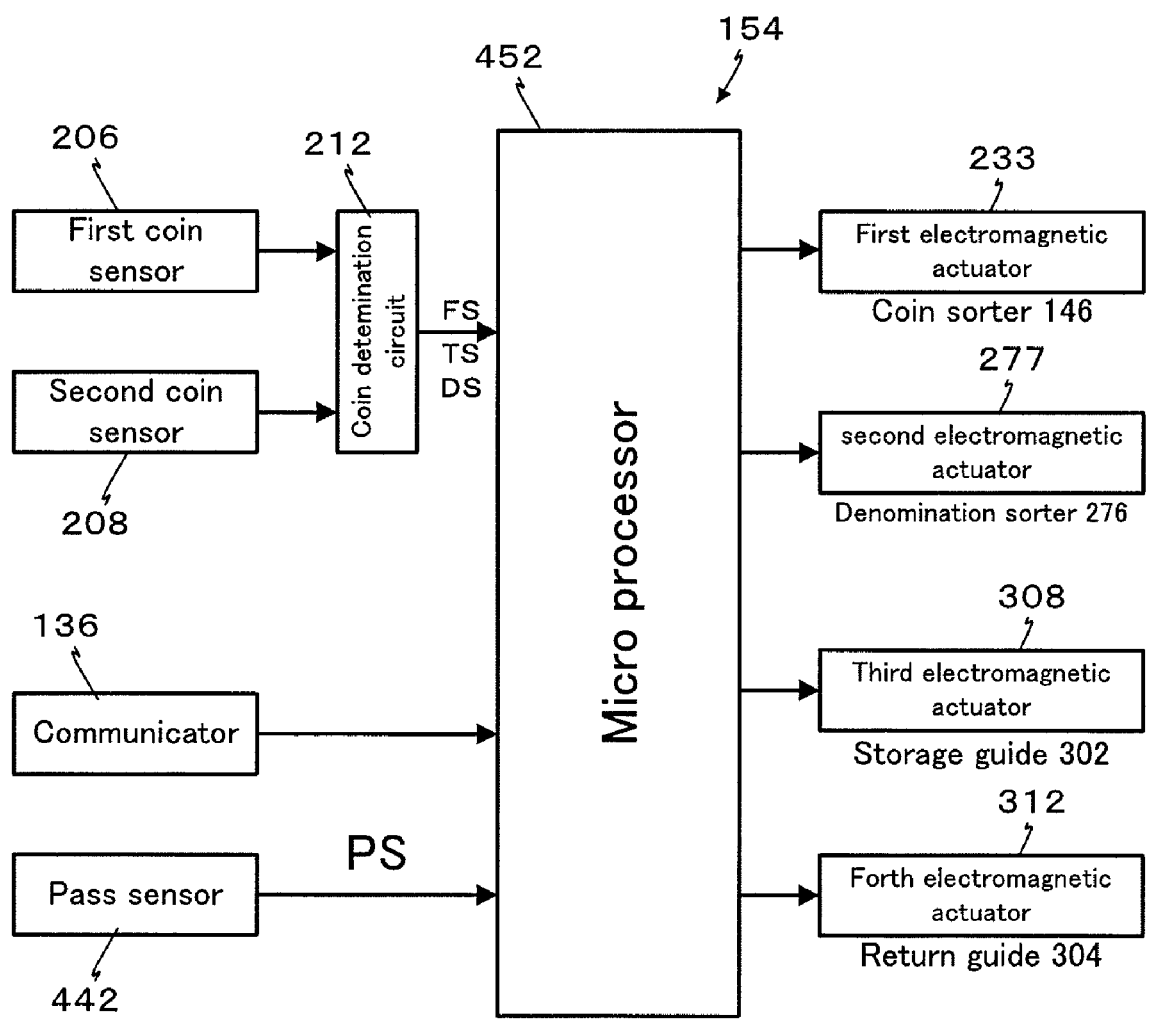
FIG. 12 is a block diagram of a controller of the value medium processing apparatus according to the embodiment.
Figure 13:
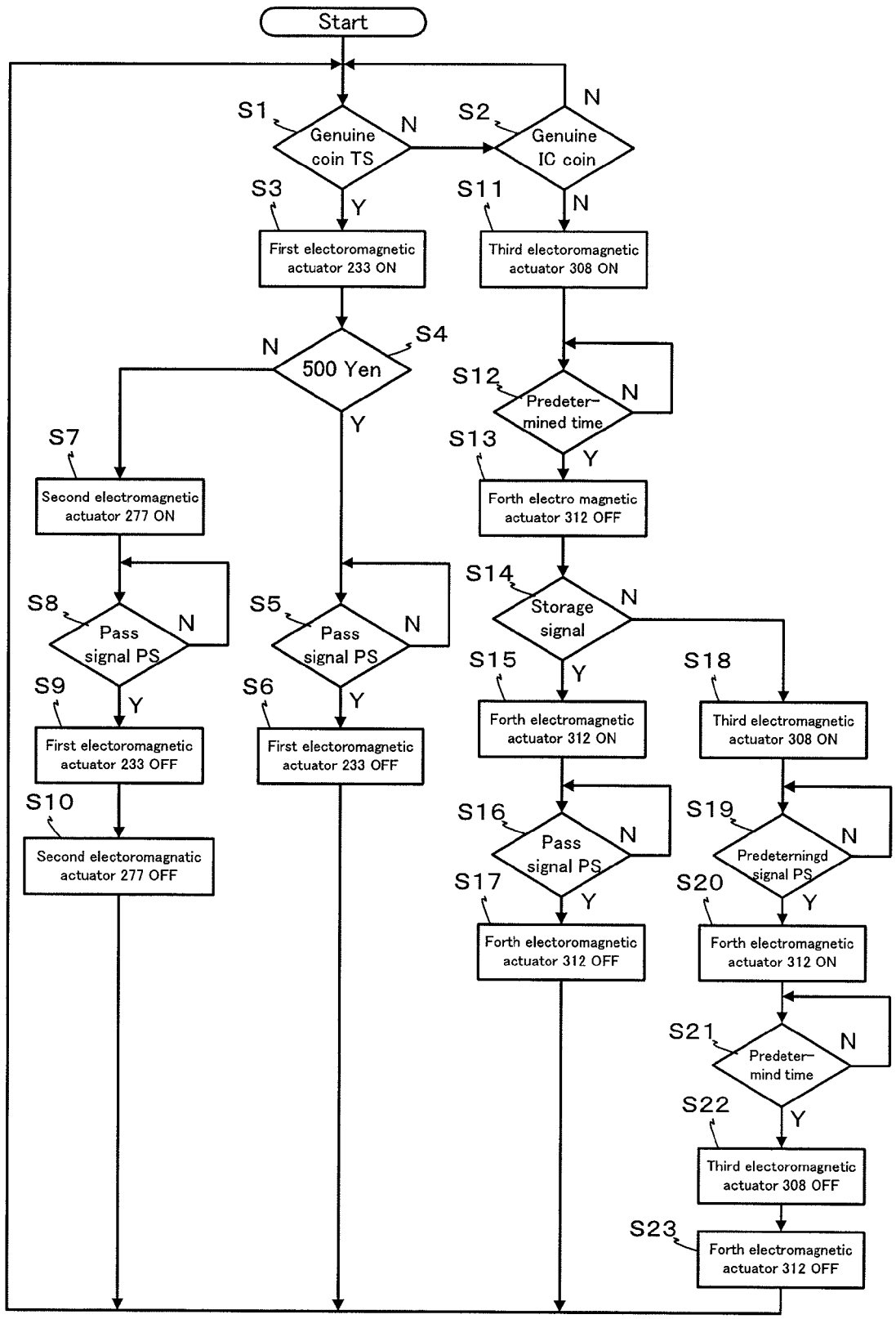
FIG. 13 is a flowchart illustrating operations of the value medium processing apparatus according to the embodiment.
Figure 14:
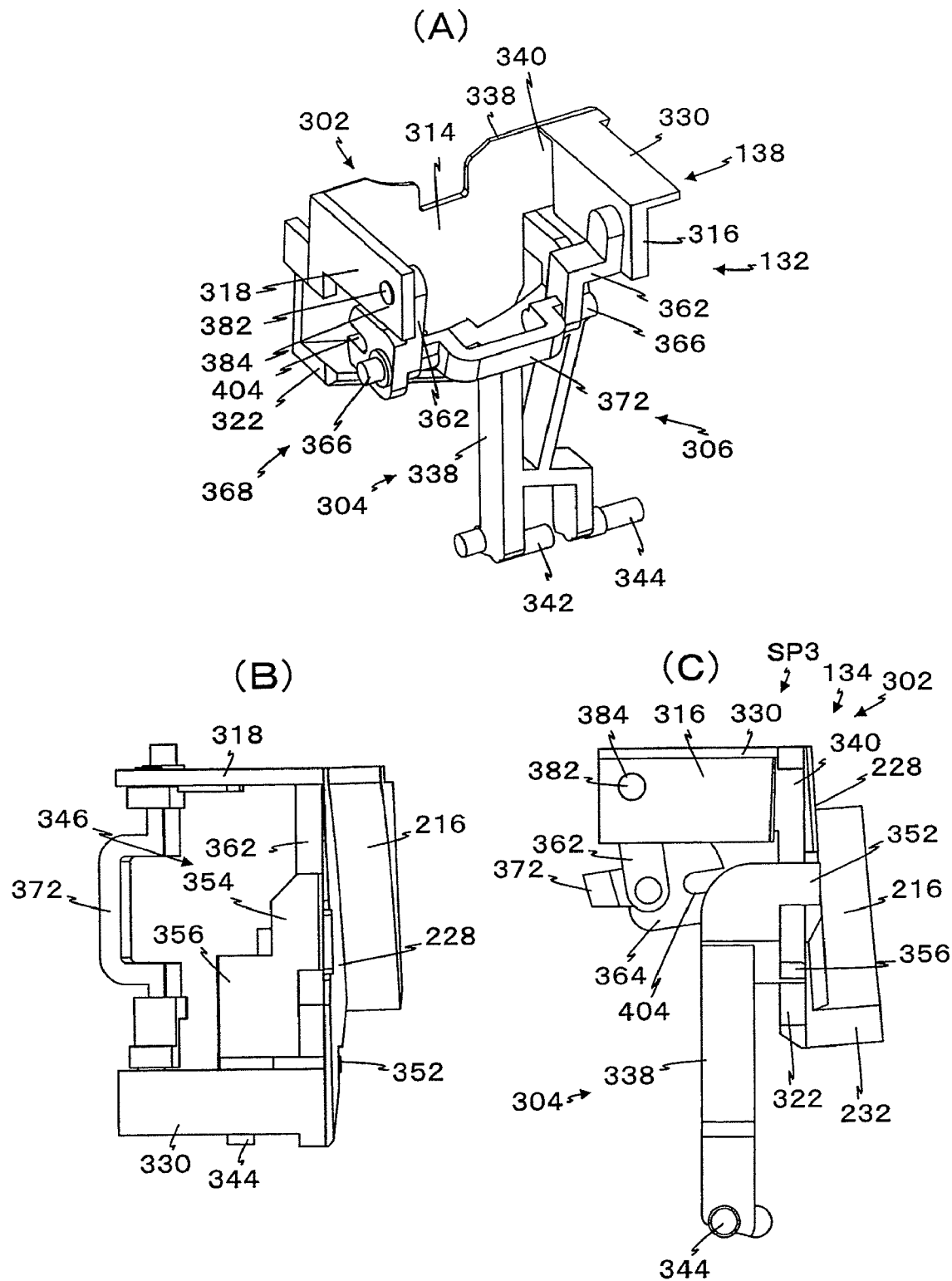
FIGS. 14A through 14C illustrate operations of the reservoir (standby mode)

An IC coin 100 suitable for a value medium processing apparatus 112 of the embodiment is first explained with reference to FIG. 11. The disk-shaped IC coin 100 can roll on a downwardly inclined path by gravity. The IC coin 100 is provided therein with an IC chip 104 having an antenna 102 capable of contactless reading and writing. The IC coin 100 has a diameter and a thickness same as those of a coin C. Specifically, the IC coin 100 includes an outer ring 106 having a ring-shaped magnetic body and an IC tag module 110 in an inner hole 108. The IC tag module 110 is integrally provided with the antenna 102 and the IC chip 104. The IC tag module 110 is combined with the outer ring 106 using thermoplastic resin, for example. Metal is used for the outer ring 106, so that the IC coin 100 is rollable and that a weight thereof increases. Stainless steel is used in the present embodiment.

In the present specification, a coin-shaped electric value information storage medium indicates the IC coin 100. The IC coin 100 preferably has a diameter and a thickness slightly less than those of regular coins C, such as, for instance, a 500 yen coin. The IC tag module 110 is preferably molded invisible in dark-colored resin, fitted in the inner hole 108, and fixed to the outer ring 106. Alternatively, the IC tag module 110 is preferably fitted in the inner hole 108 of the outer ring 106, and then a seal is affixed. The IC coin 100 may have a greater diameter than that of regular coins, so as to be easily differentiated from the regular coins. Since employing a larger size leads to a large size of the apparatus, however, it is desirable that the IC coin 100 have a size same as that of regular coins.

The value medium processing apparatus 112 according to the present invention is explained below with reference to FIGS. 1 to 10. The value medium processing apparatus 112 includes an inlet 114; a medium common rolling path 116; a coin characteristic detector 118; a coin path 122; a coin path inlet 124; an IC coin path 126; an IC coin path inlet 128; an IC coin reservoir 132; a medium sorter 134; a communicator 136; an IC coin sorter 138; an IC coin storage path 142; a return sorter 146; a return path 148; a coin storage path 152; a controller 154; and a lower outlet 156.

In the present embodiment, the value medium processing apparatus 112 is formed by a vertical rectangular base plate 162; a door plate 164, which is rotatably movably attached to the base plate 162 at an upper end; and the like. The base plate 162 is formed into de-facto standard dimensions of 3.5 inches in width and length, and molded using non-magnetic body, such as, for example, resin. A left side plate 166 and a right side plate 168 are integrally formed having a T shape on both sides of the base plate 162, thus having an H shape from a plan view as a whole.

Figure 6:
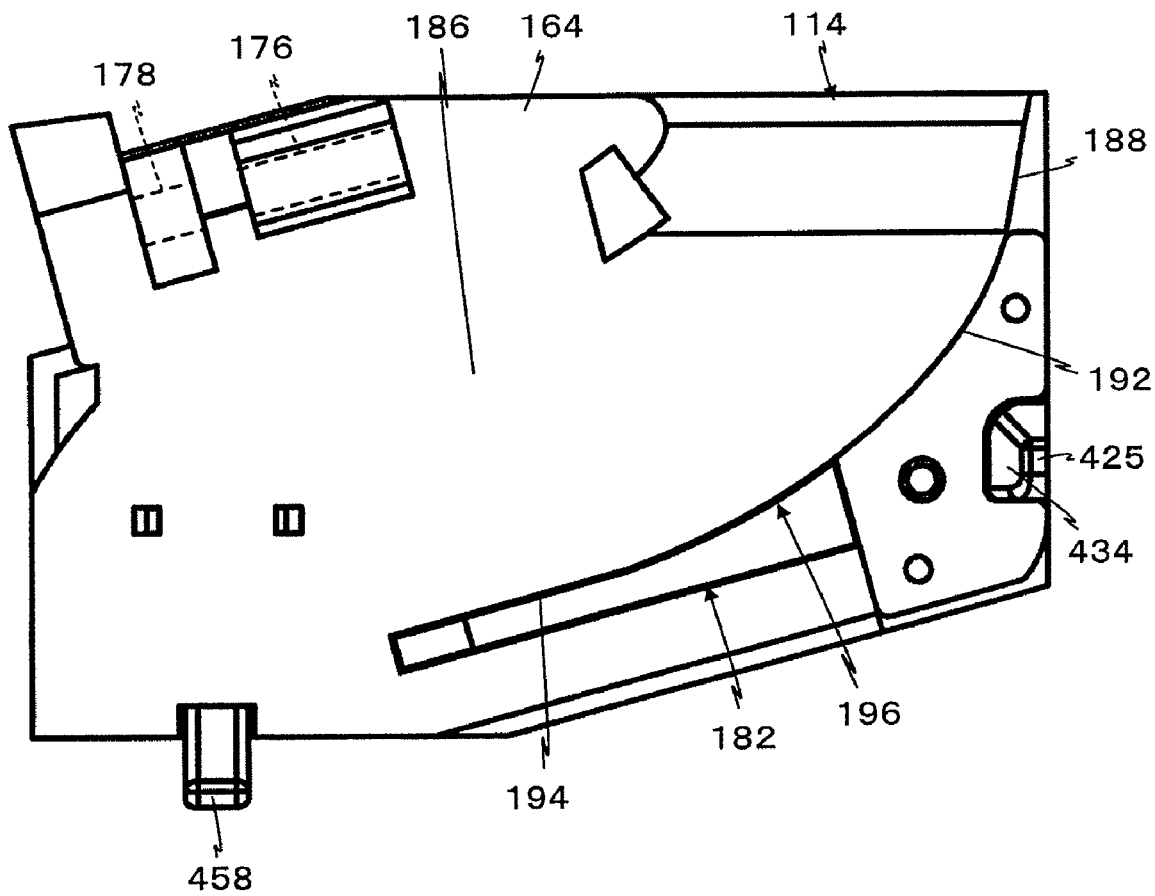
FIG. 6 is a rear view of the door plate of the value medium processing apparatus according to the embodiment.

The door plate 164 is molded using a non-magnetic body such as resin and the like. As shown in FIG. 6, shaft receiving holes 176 and 178 provided at an upper portion of the door plate 164 are rotatably movably fitted to cylindrical support shafts 172 and 174, which are provided at an upper-right portion of the base plate 162. Thereby, the door plate 164 is provided opposing an upper-half portion of the base plate 162 having a predetermined distance in between. Further, the door plate 164 is biased by a biasing unit, such as a spring and the like, so as to be close to the base plate 162. A side end surface of a rolling guide rail 182 (described hereinafter) is contacted against the base plate 162, such that the door plate 164 is held in parallel with the base plate 162 having a predetermined distance.

Figure 1:
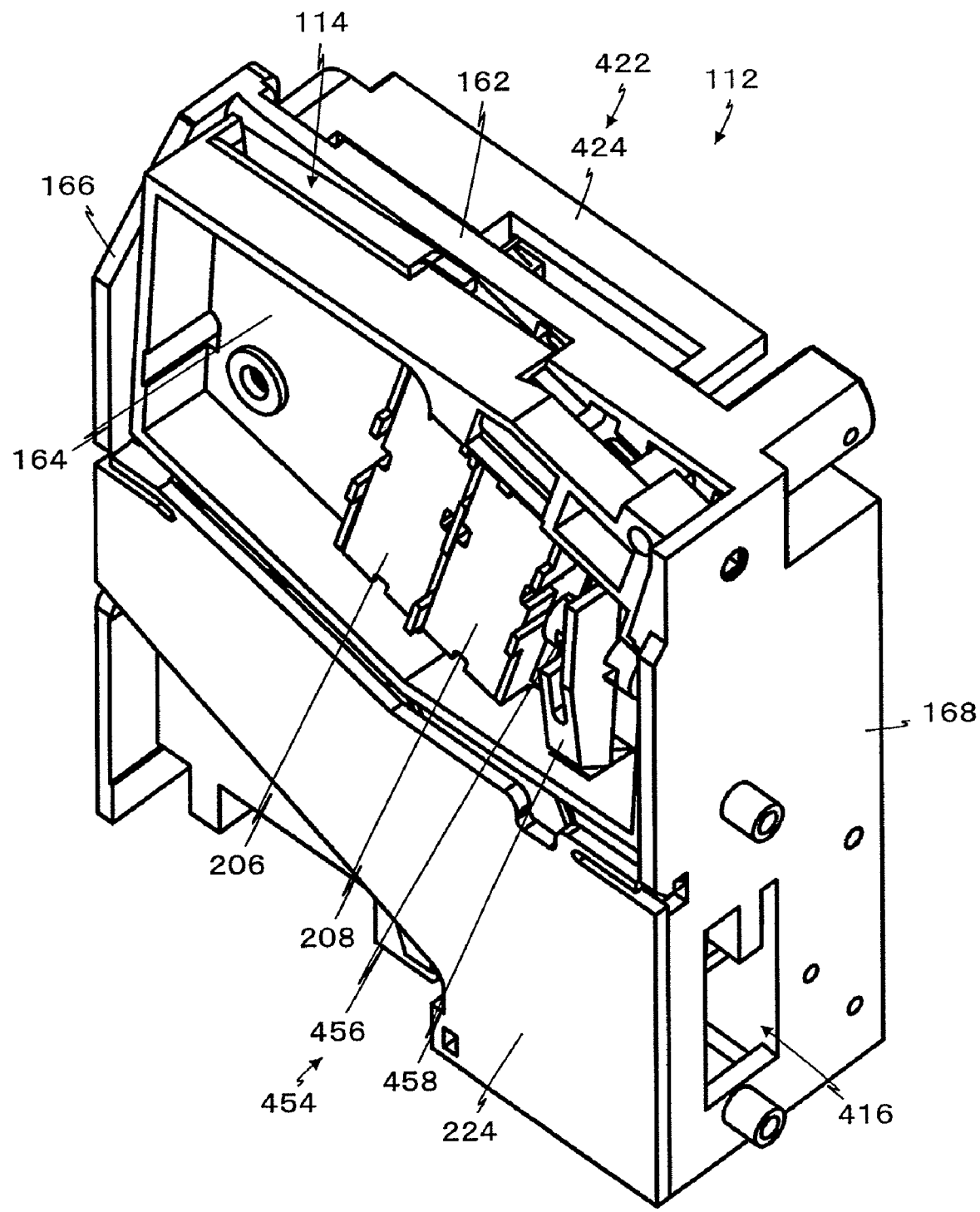
FIG. 1 is a perspective view of a value medium processing apparatus according to an embodiment.

The inlet 114 is explained below with reference to FIG. 1. The inlet 114 receives the coin C and the IC coin 100. The inlet 114 is an inlet common to the coin C and the IC coin 100. In the present embodiment, the inlet 114 has a laterally rectangular shape from a plan view, a length slightly greater than a diameter of a 500 yen coin, and a width slightly greater than a thickness of the 500 yen coin. Thus, the inlet 114 can receive the IC coin 100 and 5 yen to 500 yen coins (or alternatively or additionally, coins ranging from 5 cents to one dollar denominations). Providing the inlet 114 common to the coin C and the IC coin 100 reduces an installation area of the inlet, and accordingly reduces the apparatus size. The inlet 114 is provided at a gap in an upper-left portion of the base plate 162 and the door plate 164.

The medium common rolling path 116 is explained below with reference to FIGS. 5 and 6. The medium common rolling path 116 is a thin plate-shaped path on which the IC coin 100 and the coin C inserted into the inlet 114 roll. The medium common rolling path 116 is provided between an upper guide wall 184 of the base plate 162 and a guide wall 186 on a rear surface of the door plate 164. The upper guide wall 184 of the base plate has an upper end slightly inclined toward right with respect to a perpendicular in FIG. 4. The structure thus allows the coin C to roll while leaning against the guide wall 184.

The guide wall 186 of the door plate 164 is provided in parallel with the base plate upper guide wall 184, when the side end surface of the rolling guide rail 182 at a lower portion is in contact with the upper guide wall 184. From the upper-left end through the lower portion of the door plate 164, the arcuate rolling guide rail 182 is provided projecting laterally from the guide wall 186. The rolling guide rail 182 includes a drooping portion 188, a turning portion 192, and an inclined portion 194. The drooping portion 188 is extended substantially perpendicularly downward from the inlet 114. The turning portion 192 extending from the drooping portion turns the rolling guide rail in a lateral direction. The inclined portion 194 is linearly inclined downwardly at a predetermined angle. In the present embodiment, the turning portion 192 is formed from a metal piece, since the coin C and the IC coin 100 impulsively drop thereon. A rolling surface 196, which is an upper surface of the rolling guide rail 182, and the guide wall 186 are provided so as to form a right angle at a cross section. Further, an upper guide rail 200 is provided laterally extending from the base plate 162 above the rolling guide rail 182 and projecting in parallel with the guide rail 182. A gap between the rolling guide rail 182 and the upper guide rail 200 is provided slightly greater than a maximum diameter of the coin C and the IC coin 100.

As described above, the media common rolling path 116 is a thin plate-shaped inclined space demarcated and formed by the upper guide wall 184, the guide wall 186, the rolling guide rail 182, and the upper guide rail 200; slightly oblique with respect to the perpendicular; and having a thickness slightly greater than that of a 500 yen coin. Further, the media common rolling path 116 includes a drooping path 198, a turning path 202, and an inclined path 204. The drooping path 198 extends substantially perpendicularly downward from the inlet 114 substantially for an amount of the diameter of the coin C. The turning path 202 laterally extends from the drooping path 198. The inclined path 204 is linearly inclined forwardly and downwardly. In other words, the medium common rolling path 116 has a downwardly arcuate shape extending from the inlet 114 and forms a forwardly and downwardly inclined path as a whole. The description "forwardly and downwardly" indicates downward toward a rolling direction of the coin.

Figure 2:
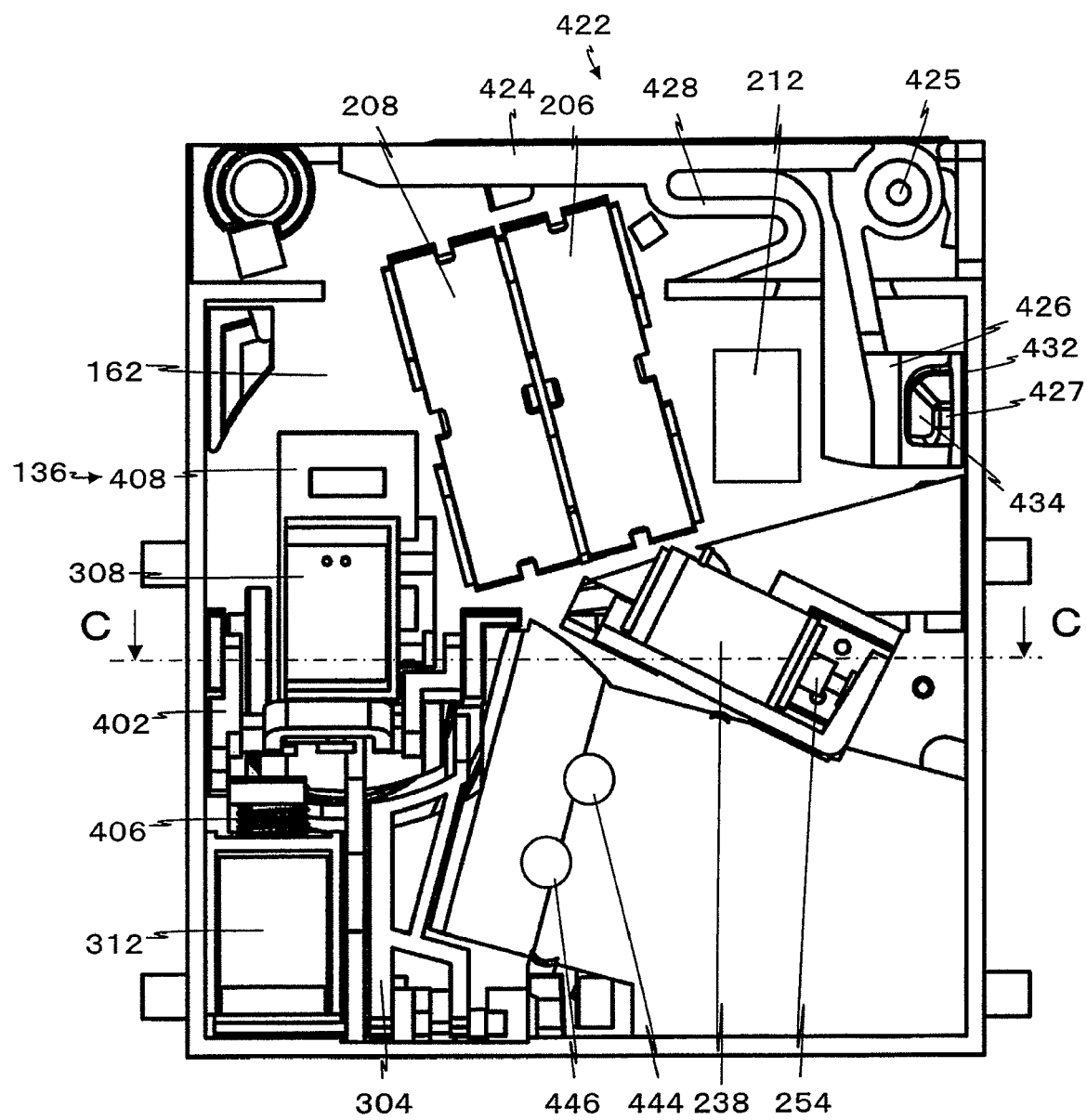
FIG. 2 is a rear view of the value medium processing apparatus according to the embodiment.

The coin characteristic detector 118 is explained below with reference to FIGS. 1, 2, and 5. The coin characteristic detector 118 detects characteristics to determine authenticity and a denomination of the coin C rolling on the medium common rolling path 116. The coin characteristic detector 118 includes a first coin sensor 206 and a second coin sensor 208, each of which is a core wound with a coil. The first coin sensor 206 and the second coin sensor 208 are provided opposing the medium common rolling path 116 and fixed to the base plate 162 and the door plate 164. The first coin sensor 206 is used to obtain characteristics pertaining to the material and diameter of the coin C.

The second coin sensor 208 is used to obtain characteristics pertaining to the thickness and diameter of the coin C. Output from the coin sensors 206 and 208 is provided to a coin determinator 212, which compares the output against predetermined reference values and determines whether the coin C is a true coin or a false coin and a denomination thereof. When determining that the coin C is false, the coin determinator 212 outputs a cancel signal CS to the return sorter 146. The first coin sensor 206 and the second coin sensor 208 are disposed so as to face the coin C rolling on the linearly inclined portion 194. Since a position of the coin C does not change with respect to the rolling surface 196 of the rolling guide rail 182, highly accurate detection of characteristics can be performed. When the IC coin 100 of the present embodiment is used, the coin characteristic detector 118 detects characteristics of the metal outer ring 106, thereby capable of functioning as an IC coin 100 characteristic detector.

The coin path 122 is explained below with reference to FIGS. 5 and 8. The coin path 122 guides a coin determined as the coin C while the coin rolls on the medium common rolling path 116. The coin path 122 is provided extending from the turning path 214, which extends from the medium common rolling path 116. The coin path 122 is a path linearly downwardly inclined in an opposite direction to the medium common rolling path 116 therebelow. In other words, the coin path 122 is forwardly and downwardly inclined. Accordingly, the coin path 122 includes the turning path 214 in a broad sense. The coin path 122 has a thickness greater than a maximum thickness of used media. Thus, when the IC coin 100 wrongly reaches the coin path 122, the IC coin 100 can roll on the coin path 122.

The coin path 122 is a vertically long linear path having a cross-sectionally rectangular shape and surrounded by an intermediate plate 215, the right side plate 168, a turning guide 216, a coin path guide rail 218, a coin guide 222, and a side cover 224. Specifically, the coin path 122 is turned in the opposite direction by the turning path 214 extending from the medium common rolling path 116, and then downwardly inclined in the opposite direction below the medium common rolling path 116. More specifically, the medium common rolling path 116, the turning path 214, and the coin path 122 have a lateral V shape. Vertically disposing the medium common rolling path 116 and the coin path 122 as described above reduces a size in a lateral direction.

The turning path 214 is demarcated by the intermediate plate 215, the right side plate 168, a side wall 228 of the IC coin reservoir 132 (described hereinafter), the turning guide 216, and the side cover 224. The turning guide 216 is integrally provided with the side wall 228 and forms an arcuate turning guide rail 232. The coin path guide rail 218 is provided on an extended line of the turning guide rail 232 and forms a linearly downward guide rail as a whole. The perpendicular intermediate plate 215 provides demarcation from the IC coin storage path 142. With the structure above, the coin inlet 124 is provided in a middle region of the turning path 214.

The return sorter 146 is explained below with reference to FIGS. 5, 8, and 9. The return sorter 146 primarily sorts the coin C rolling on the coin path 122 into the return path 148 or a storage safe through the coin storage path 152. The coin sorter 146 secondarily guides the IC coin 100 and a false coin to the return path 148. The return sorter 146 includes a coin sorting body 236, a first electromagnetic actuator 233, and a first link mechanism 242. The coin sorting body 236 can selectively be positioned in a cancel position CP or a storage position SP, the cancel position CP intersecting the coin path 122, the storage position SP guiding the coin to the coin storage path 152. The coin sorting body 236 is a planar flap 238 rotatably movable pivoting on a first vertical shaft 244.

The first vertical shaft 244 is supported on the coin path guide rail 218 and a second upper guide rail 246. A driven pin 252, which is provided at an end of a link lever 248 laterally extending from an upper end portion of the first vertical shaft 244, is inserted into a driving groove 258, which is provided in a driving body 256 fixed to an iron core 254 of the first electromagnetic actuator 233. The iron core 254 is normally biased in a projecting direction by a spring (not shown in the drawings). The coin sorting body 236 is held at the cancel position CP via the lever 248, the driven pin 252, and the driving body 256 (a position indicated with a solid line in FIG. 8). The coin C rolling on the turning guide rail 232 is deflected in a lateral direction by the coin sorting body 236 intersecting the coin path 122, and then dropped from the coin path guide rail 218. The dropped coin C is dropped from the return path 148, and then guided to the lower outlet 156 further to a return outlet of a game machine and the like. Accordingly, a false coin is removed from the coin path 122.

Figure 8:
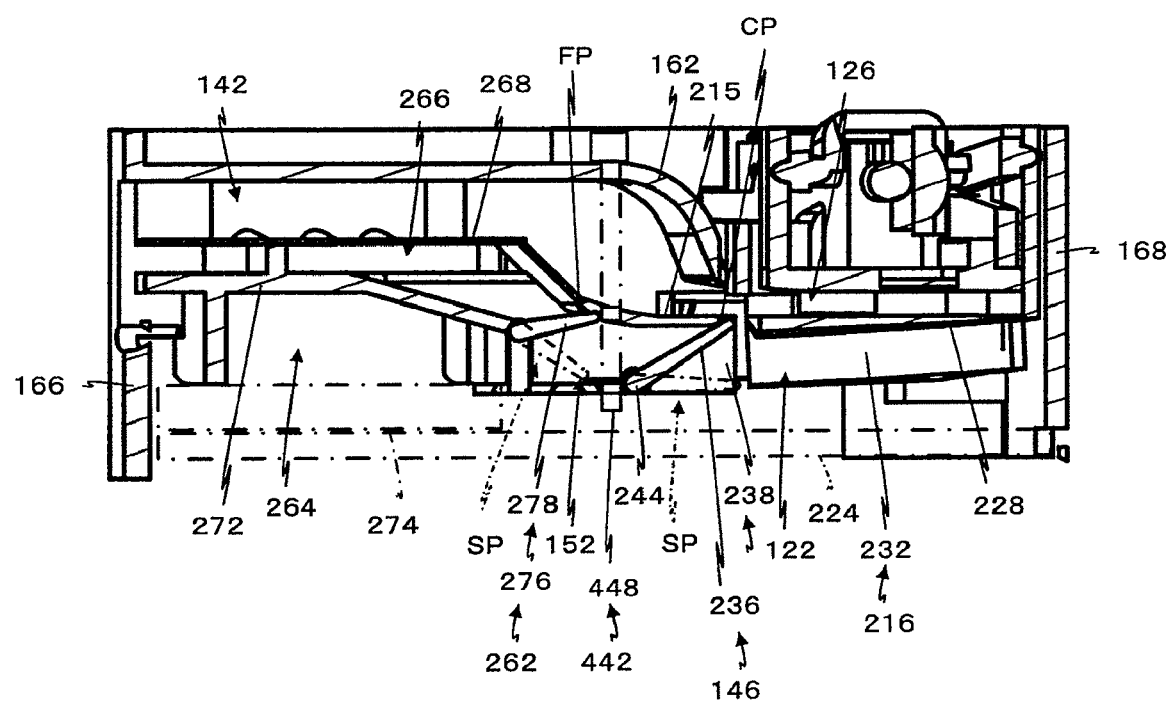
FIG. 8 is a cross-sectional view of the value medium processing apparatus according to the embodiment along line A-A of FIG. 5.
Figure 9:
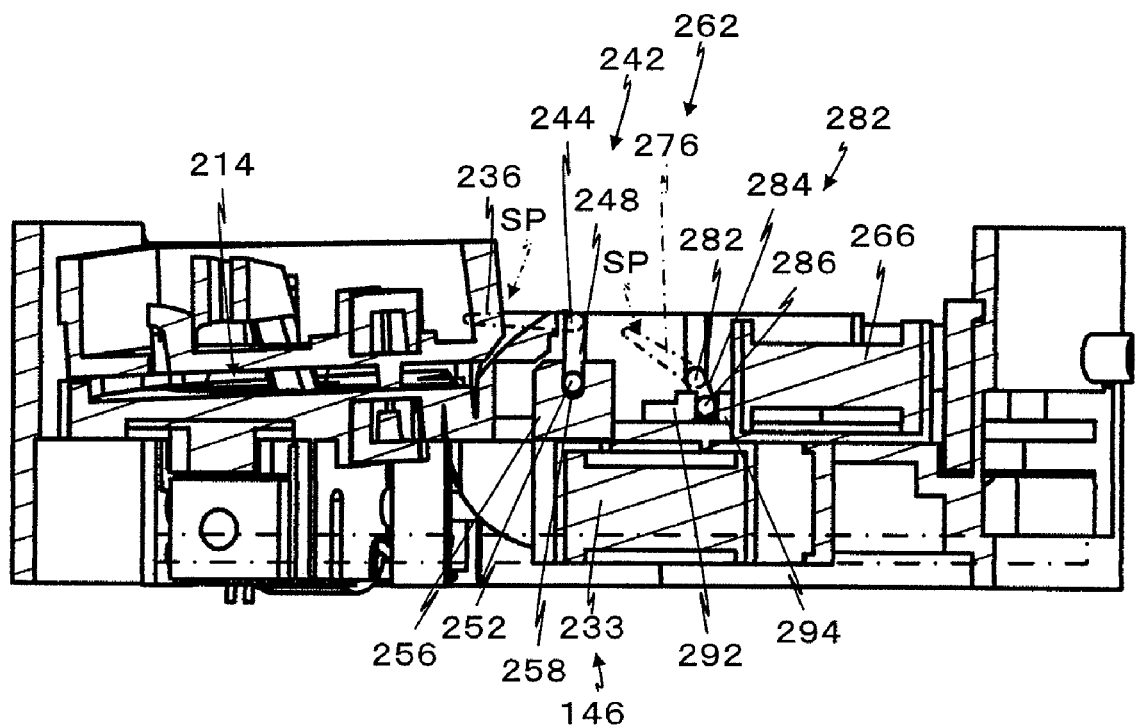
FIG. 9 is a cross-sectional view of the value medium processing apparatus according to the embodiment along line B-B of FIG. 5.
Figure 10:
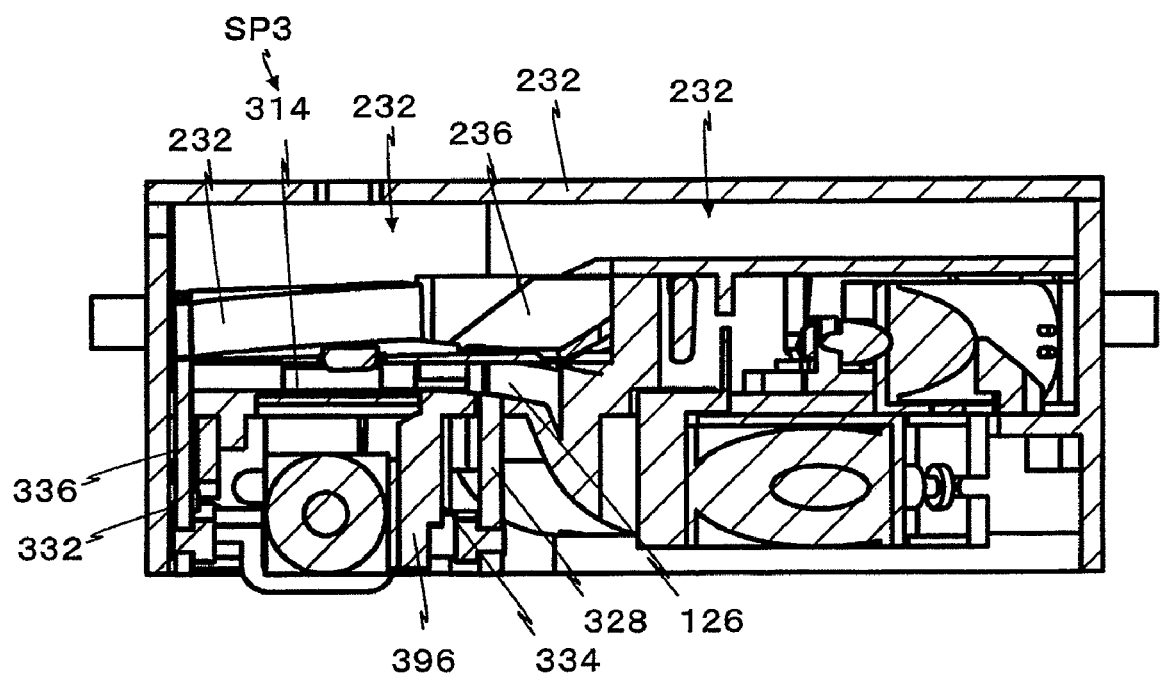
FIG. 10 is a cross-sectional view of the value medium processing apparatus according to the embodiment along line C-C of FIG. 2.

When the first electromagnetic actuator 233 is magnetized, the iron core 254 is pulled in; and the flap 238 is rotatably moved clockwise in FIG. 8 via the lever 248 and the like, and moved to the storage position SP (a position indicated with a dotted line in FIG. 8). Thereby, the coin C rolling from the turning guide rail 232 to the coin path guide rail 218 can roll on the coin path 122 without being interrupted by the coin sorting body 236. Accordingly, a true coin C can be stored.

A denomination sorter 262 is explained below with reference to FIGS. 5, 8, and 9. The denomination sorter 262 sorts the true coin C rolling on the coin storage path 152 into the coin storage path 152 corresponding to a denomination. Ten yen to 500 yen coins (or coins of other countries and denominations) C are accepted in the present embodiment. A high value coin, including but not limited to a 500 yen coin 500C, is sorted to a first coin storage path 264; a lower value coin, including but not limited to 10 yen to 100 yen coins C are sorted to a second coin storage path 266.

The first coin storage path 264 is provided on an outer side of a second partition wall 272, which is provided in parallel with a first partition wall 268 having a predetermined space, the first partition wall 268 extending from the intermediate plate 215 provided in parallel with the base plate 162 having a predetermined distance. The first coin storage path 264 has a size that allows a 500 yen (or other high-value) coin to move without being jammed. An outer side surface of the first coin storage path 264 is covered by a plate 274. The second coin storage path 266 has a size that allows 10 yen to 100 yen (or other lower-value) coins to move without being jammed. The common coin storage path 152 is provided downstream of the coin path 122 extending therefrom. The first coin storage path 264 and the second coin storage path 266 are provided in parallel extending from an outlet of the common coin storage path 152. Thereby, the coin path 122 includes the common coin storage path 152, the first coin storage path 264, and the second coin storage path 266. Alternatively, the common coin storage path 152 alone may be provided, without being separated into the first coin storage path 264 and the second coin storage path 266. When the first coin storage path 264 and the second coin storage path 266 are provided separately, however, collection work is easy since coins can be sorted into denominations when a variety of denominations are acceptable.

The denomination sorter 262 is provided in order to selectively open and close an inlet to the first coin storage path 264 or the second coin storage path 266. The denomination sorter 262 includes a denomination sorting body 276, a second electromagnetic actuator 277, and a second link mechanism 282. The denomination sorting body 276 can selectively be positioned in a first position FP or a second position SP2, the first position FP closing the inlet to the first coin storage path 264, the second position SP2 closing the inlet to the second coin storage path 266. The denomination sorting body 276 is a planar flap 278 rotatably movable pivoting on a second vertical shaft 282.

The second vertical shaft 282 is supported on the coin path guide rail 218 and the second upper guide rail 246. A driven pin 286, which is provided at an end of a link lever 284 laterally extending from an upper end portion of the second vertical shaft 282, is inserted into a driving groove 294, which is provided in a driving body 292 fixed to an iron core 288 of the second electromagnetic actuator 277. The iron core 288 is normally biased in a projecting direction by a spring (not shown in the drawings). The coin sorting body 276 is held at the second position SP2 via the lever 284, the driven pin 286, and the driving body 292. The coin C rolling on the coin path guide rail 218 is guided to the second coin storage path 266 by the denomination sorting body 276 closing the first coin storage path 264. When the second electromagnetic actuator 277 is magnetized, the iron core 288 is pulled in; and the flap 278 is rotatably moved counterclockwise in FIG. 8 via the link lever 284 and the like, and moved to the first position FP indicated with the solid line in FIG. 8. Thereby, the coin C rolling on the coin path guide rail 218 is guided to the first coin storage path 264 by the denomination sorting body 276 closing the inlet to the second coin storage path 266.

The IC coin reservoir 132 is explained below with reference to FIGS. 4, 5, 7, 8, and 11A to 14C. When the IC coin 100 is inserted, the IC coin reservoir 132 receives the IC coin 100 rolling on the medium common rolling path 116 and reserves it on the IC coin path 126. In the present embodiment, the IC coin reservoir 132 also functions as the medium sorter 134. Specifically, the IC coin reservoir 132 also guides coins C rolling on the medium common rolling path 116 to the coin path 122 or the IC coin path 126. Since the IC coin reservoir 132 and the medium sorter 134 are integrally provided in the present embodiment, an installation space can be reduced, and thus the value medium processing apparatus 112 can be downsized. In addition, the IC coin reservoir 132 also functions as the IC coin sorter 138 in the present embodiment as described hereinafter, and thereby further downsizing can be achieved. The IC coin reservoir 132 includes a storage guide member 302, a return guide member 304, a link member 306, and a third electromagnetic actuator 308.

The storage guide member 302 is first explained with reference to FIGS. 7 and 14A to 14C. Collaborating with the return guide member 304, the storage guide member 302 receives and reserves the IC coin 100 rolling on the medium common rolling path 116. When the IC coin 100 is an IC coin 100 to be stored, the storage guide member 302 guides the IC coin 100 to the IC coin storage path 142. The storage guide member 302 includes a guide holding wall 314 having a vertically inverted trapezoidal shape; guided stays 316 and 318 laterally and horizontally extending from both side ends of an upper end portion of the guide holding wall 314; a holding storage rail 322 projecting toward a rear surface side of the base plate 162 from a lower end of the guide holding wall 314; and a turning guide 216. On a lower portion on a turning path 214 side of the guide holding wall 314, the turning guide 216 is integrally provided. A side wall substantially perpendicularly standing from the turning guide 216 is a guide side wall 228.

Figure 5:
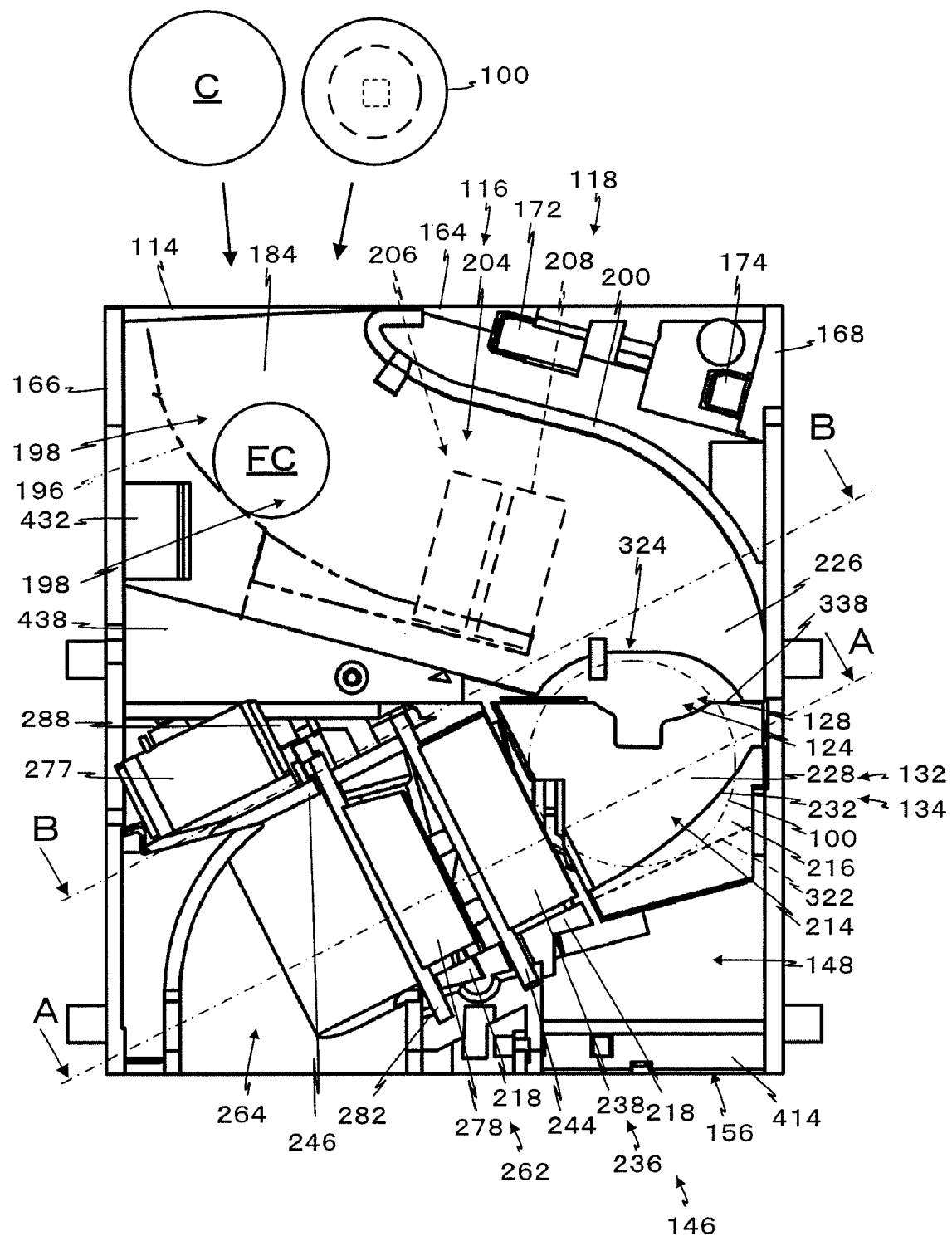
FIG. 5 is a front view of the value medium processing apparatus according to the embodiment when the door plate and a cover of a coin path are removed.

A substantially rectangular reserve recess 324 is provided opposing the turning path 214 of the base plate 162 (refer to FIG. 5). The reserve recess 324 is dented for an amount of the thickness of the IC coin 100 plus the guide holding wall 314, with respect to the upper guide wall 184. In other words, when the storage guide body 302 is positioned in a standby position described hereinafter, a front surface on the turning path 214 side of the guide holding wall 314 continues to be in a position slightly dented from an extended line of the upper guide wall 184. The guided stays 318 and 316 are tightly and slidably inserted into guide grooves 334 and 336, which are provided horizontally opposing guide stays 328 and 332 horizontally extending to the rear surface side of the base plate 162 on right and left sides of a slide aperture 324 of the base plate 162. A planar rolling stopper 330 extending substantially horizontally is provided on an upper end of the guided stay 316. A storage groove 340 is provided to the guided stay 316 adjacent to the guide holding wall 314. A width of the storage groove 340 is provided slightly greater than the thickness of the IC coin 100, so that the IC coin 100 can roll and pass.

When the storage guide member 302 is mounted on the base plate 162, the holding storage rail 322 is provided at a same inclination as the coin path guide rail 218 in FIG. 5. Further, an upper edge 338 of the guide holding wall 314 is provided substantially horizontally in a substantially middle region of the turning path 214. The storage guide member 302 is laterally slidable with respect to the base plate 162. In a normal standby mode, the storage guide member 302 is positioned in a standby position SP3, where the storage guide member 302 is retracted into a recess 326 of the base plate 162, and the guide side wall 228 demarcates one side wall of the turning path 214. In this position, the turning guide 216 forms the turning guide rail 232 for the coin C on the turning path 214, which is the coin path 122.

The return guide member 304 is explained below. The return guide member 304 has a substantially Y shape. Support shafts 342 and 344, which laterally project from a lower portion of a substantially vertically provided leg 338, are rotatably movably inserted into shaft holes of shaft receivers 347 and 348, respectively, which project backwards from the rear surface of the base plate 162. An upper end portion of the leg 338 includes a mount portion 346 and a storage stopper 350, the mount portion 346 extending substantially horizontally toward a right side plate 168 side, the storage stopper 350 perpendicularly standing from a right side plate 166 side of the mount portion 346. A stopper projection 352 is provided laterally from an upper end portion of the storage stopper 350. The stopper projection 352 prevents the IC coin 100 from moving to the IC coin storage path 142.

Figure 15:
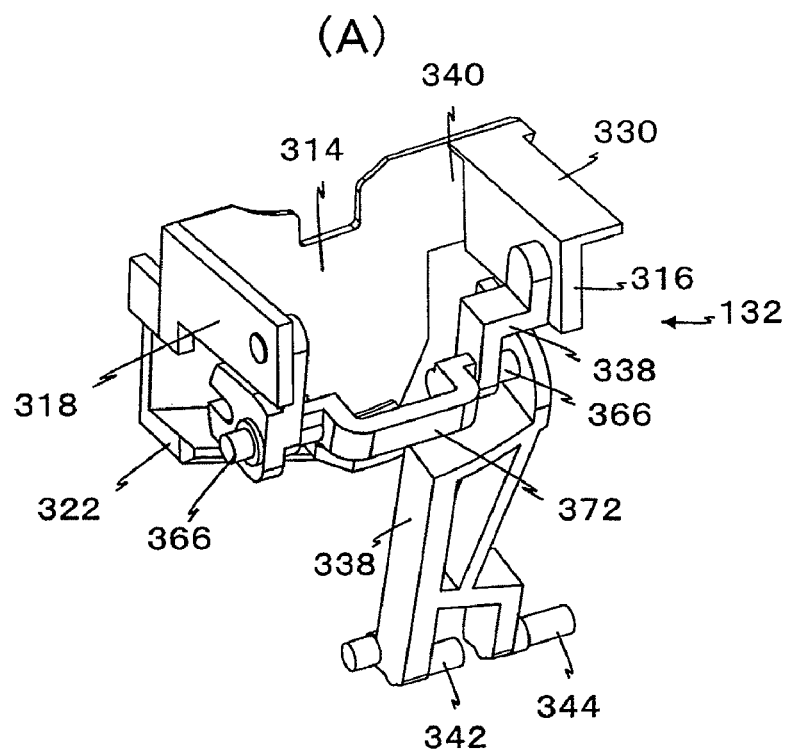
FIGS. 15A through 15C illustrate operations of the reservoir (reception mode)
Figure 15:
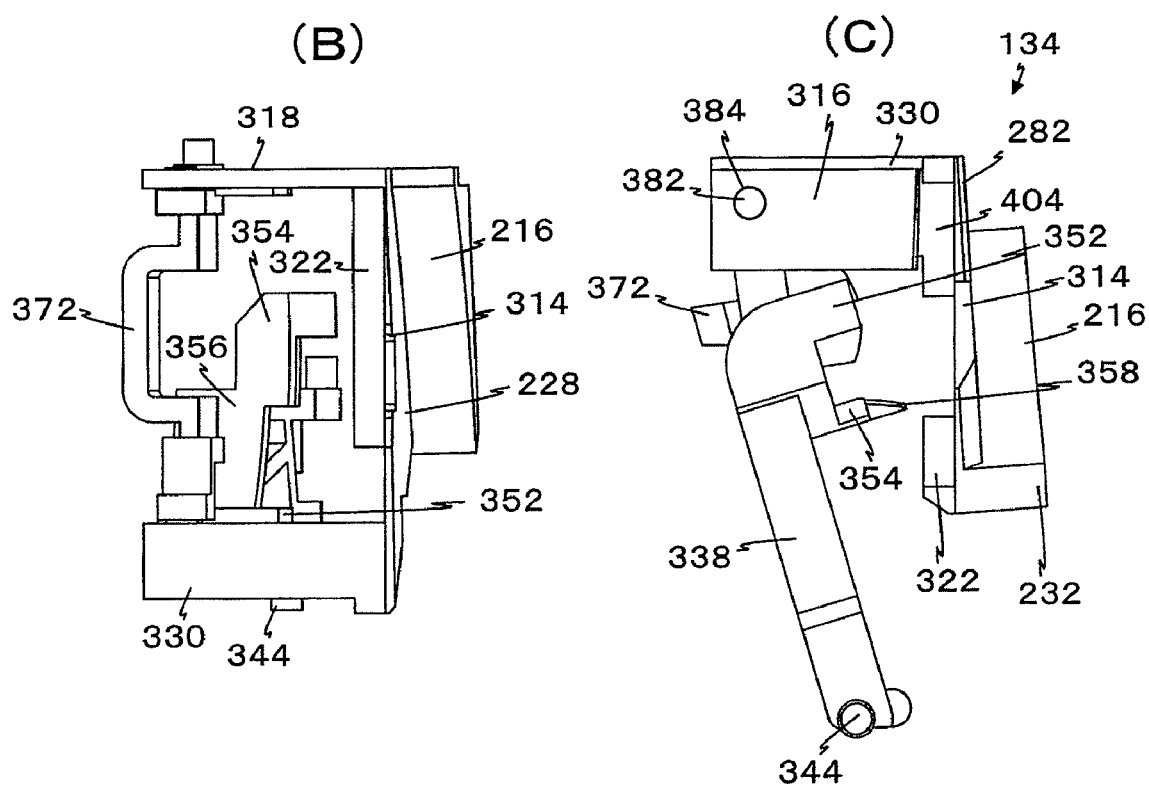

As shown in FIGS. 14A to 14C, the mount portion 346 includes a horizontal portion 354 and an upward portion 356 from a plan view, the horizontal portion 354 being provided substantially horizontally, the upward portion 356 being provided closer to a storage stopper 350 side than the horizontal portion 354 and curving upward. A storage guide projection 358 is provided projecting horizontally toward the guide holding wall 314 side from a side end portion of the right side plate 168 of the horizontal portion 354. As shown in FIGS. 15A to 15C, the upward portion 356, the horizontal portion 354, and the storage guide projection 358 are provided so as to gradually near the guide holding wall 314 in the order. A top end of the stopper projection 352 and a side end of the horizontal portion 354 are provided apart from the guide holding wall 314 having a substantially same distance.

The link member 306 is explained below. The link member 306 converts a vertical linear motion of the third electromagnetic actuator 308 into a horizontal linear motion of the storage guide member 302. The link member 306 has an L shape including a vertically extending driving portion 362 and a horizontally extending driven portion 364. Swing members 368 are provided on left and right sides, the swing members 368 including support shafts 366 externally projecting from bent portions. The left and right swing members 368 are connected by a link bar 372. Thereby, an upward channel shape is formed as a whole. The left and right support shafts 366 are swingably inserted into a shaft hole 374 of the right side plate 168 and a shaft hole 378 of a shaft receiver 376 backwardly and horizontally projecting from the rear surface of the base plate 162. Pins 382 externally and laterally projecting from upper end portions of the driving portion 362 are inserted into shaft holes 384 of the guided stays 316 and 318, respectively. Thereby, when the link member 306 swings, the storage guide member 302 is moved reciprocally in a horizontal direction.

A fourth electromagnetic actuator 312 is explained below. The fourth electromagnetic actuator 312 selectively swings the return guide member 304. The fourth electromagnetic actuator 312, which is a commonly called electromagnetic solenoid, is fixed to the rear surface side of the base plate 162. Magnetization and demagnetization of a coil linearly moves an iron core 386 in a vertical direction. A link piece 388 is fixed to the iron core 386 of the fourth electromagnetic actuator 312. A driven pin 394, which projects from a side surface off a shaft line of the support shafts 342 and 344 of the leg 338, is inserted into a lateral driving groove 392 at a lower end portion. When the fourth electromagnetic actuator 312 is demagnetized, the iron core 386 and thus the link piece 388 are moved to a lowest position by a spring (not shown in the drawing). Thereby, the driven pin 394 is rotatably moved to a most clockwise position, as shown in FIGS. 14A to 14C, and the leg 338 stands substantially perpendicularly. When the fourth electromagnetic actuator 312 is demagnetized, the link piece 388 is pulled up, and the leg 338 is rotatably moved via the driven pin 394 to a most counterclockwise position, as shown in FIGS. 15A to 15C and 17A to 17C.

The third electromagnetic actuator 308 is explained below. The third electromagnetic actuator 308 moves the storage guide member 302 in a perpendicular direction to the base plate 162. The third electromagnetic actuator 308, which is a commonly called electromagnetic solenoid, is fixed to the rear surface side of the base plate 162. Magnetization and demagnetization of a coil linearly moves an iron core 396 in a vertical direction. A link piece 398 is fixed to the iron core 396 of the third electromagnetic actuator 308. A lateral driving pin 402 in a lower portion of the link piece 398 is inserted into a driven groove 404 of a driven portion 364. When the third electromagnetic actuator 308 is demagnetized, the iron core 396 and thus the link piece 398 are moved to a highest position by a spring 405.

Thereby, the swing members 368 are rotatably moved to the most counterclockwise, as shown in FIGS. 14A to 14C.

Specifically, the storage guide member 302 is moved to a position closest to the base plate 162, and the guide holding wall 314 is moved into the reserve recess 324 and positioned in the standby position SP3. In this state, the guide holding wall 314 is substantially flush with the base plate upper wall surface 184, and the turning guide rail 232 demarcates the turning path 214. Thereby, the coin C rolling on the medium common rolling path 116 moves on the turning path 214, while a periphery thereof is guided by the turning guide rail 232 and a side surface thereof is guided by the guide holding wall 314.

Figure 16:
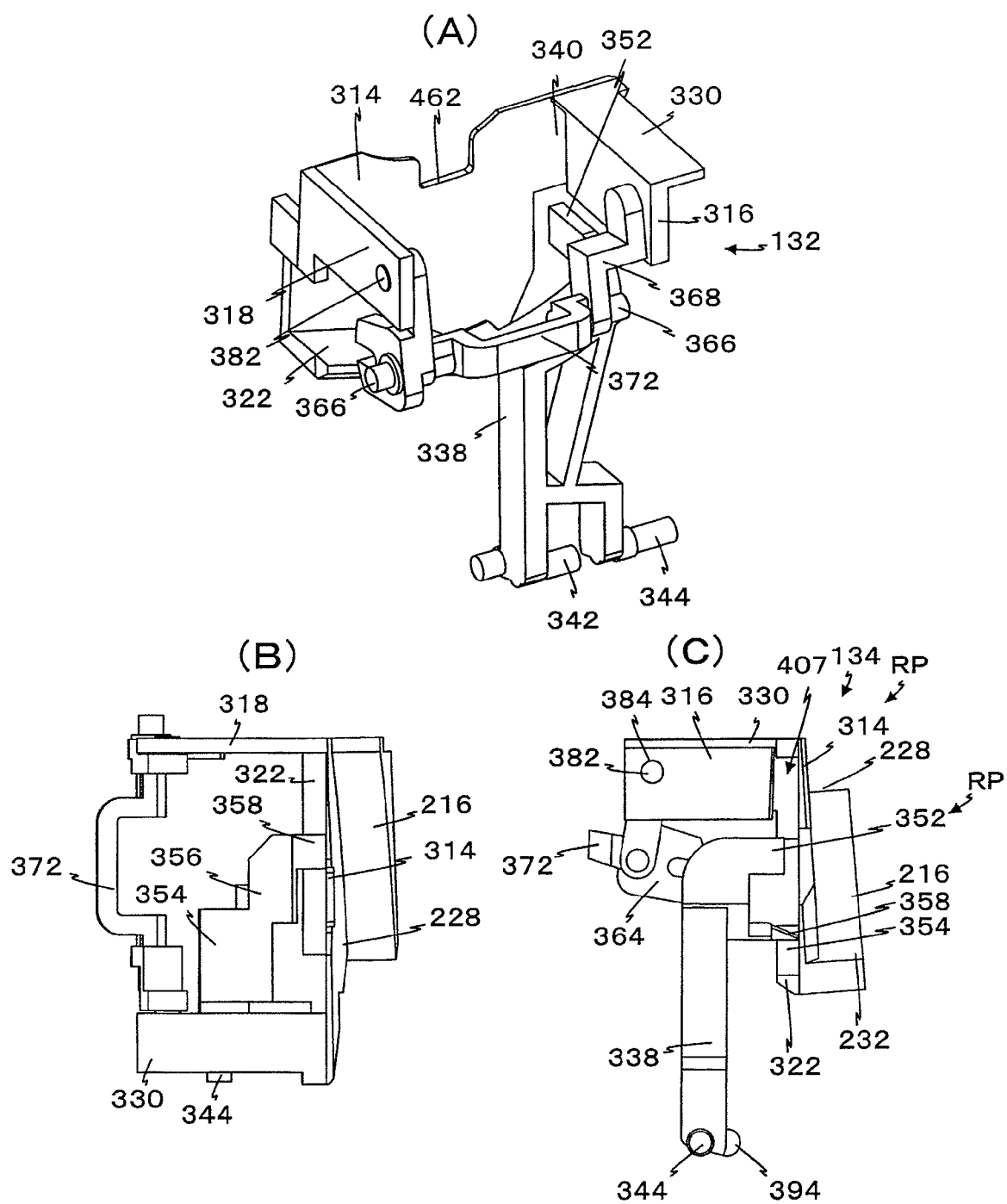
FIGS. 16A through 16C illustrate operations of the reservoir (storage mode)
Figure 17:
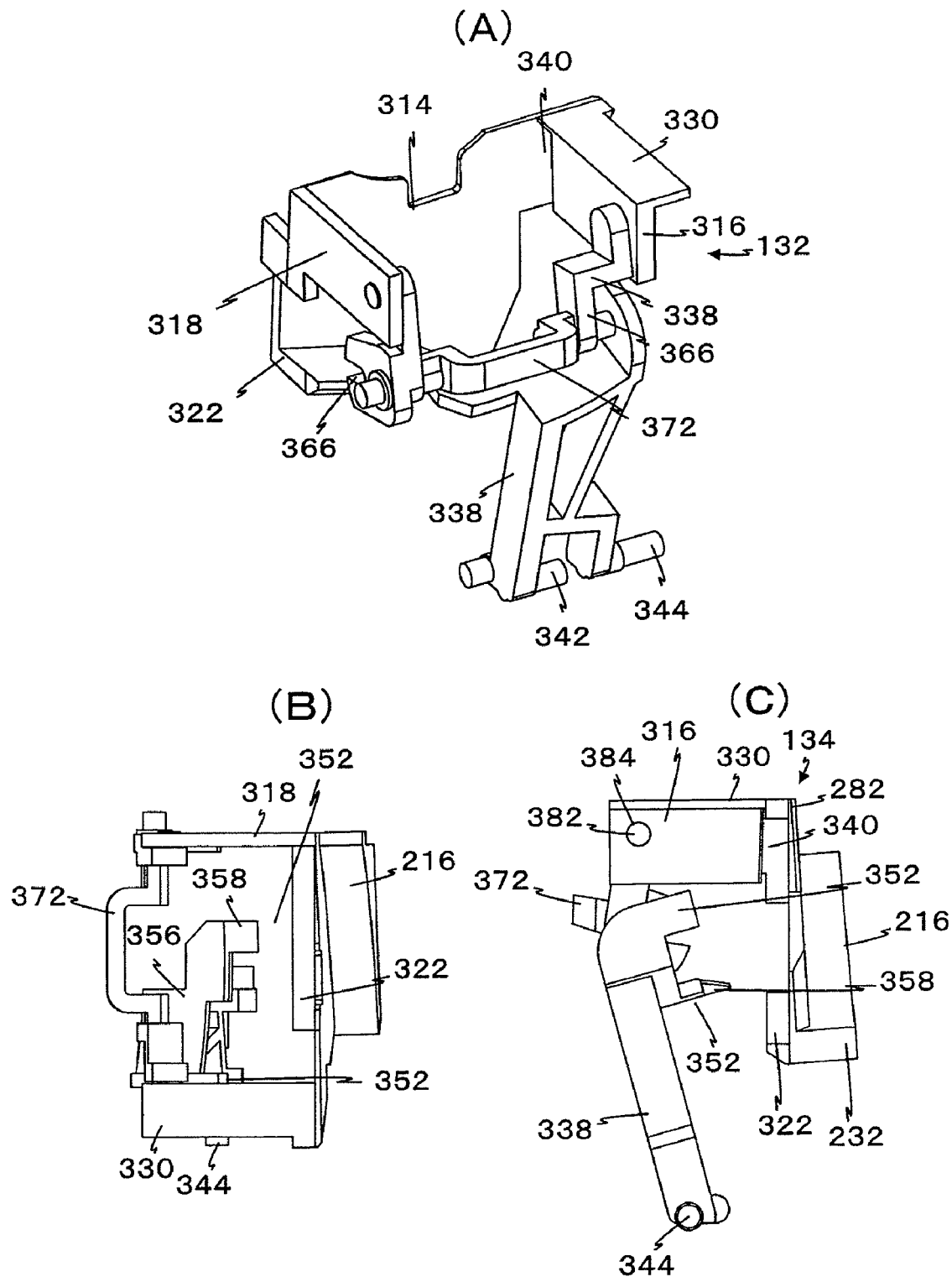
FIGS. 17A through 17C illustrate operations of the reservoir (return mode).

When the third electromagnetic actuator 308 is magnetized, the link piece 398 is moved downward, and the swing members 368 are rotatably moved clockwise via the driving pin 402 and the driven portion 364, as shown in FIGS. 16A to 16C. Thereby, the driving portion 362 and the driving pin 382 are rotatably moved clockwise, and thus the storage guide member 302 is moved in parallel to the right. Consequently, the holding storage rail 322 is positioned at a reserve position RP as an extension of the medium common rolling path 116. In this state, the storage guide projection 358 is positioned slightly above and overlapping the holding storage rail 322. Specifically, an IC coin reserve chamber 407 is formed on the turning path 214, the IC coin reserve chamber being surrounded by the guide holding wall 314 and the side wall of the recess 326 on a side surface, by the holding storage rail 322 on a lower surface, and by the stopper projection 352 and the guided stay 318 on a side periphery.

The IC coin 100 rolling on the inclined path 204 is dropped into the IC coin reserve chamber 407, so as to be reserved. Immediately after the coin is dropped, the third electromagnetic actuator 308 is demagnetized, and the link piece 398 is moved downward. Thereby, the swing members 368 are rotatably moved counterclockwise from the position in FIGS. 16A to 16C, and moved to the standby position SP3 in FIGS. 14A to 14C. The IC coin 100 reserved in the IC coin reserve chamber 407 is processed in a predetermined manner by the communicator 136 in the standby position SP3. When the storage guide member 302 of the IC coin sorter 138 is positioned in the standby position SP3, the coin C is guided to the coin path 122; when the storage guide member 302 is positioned in the reserve position RP, the IC coin 100 is guided to the IC coin path 126. Further, when the storage guide member 302 is positioned in the reserve position RP, the IC coin 100 is reserved. Thereby, the IC coin reservoir 132 also functions as the IC coin sorter 138.

Figure 7:
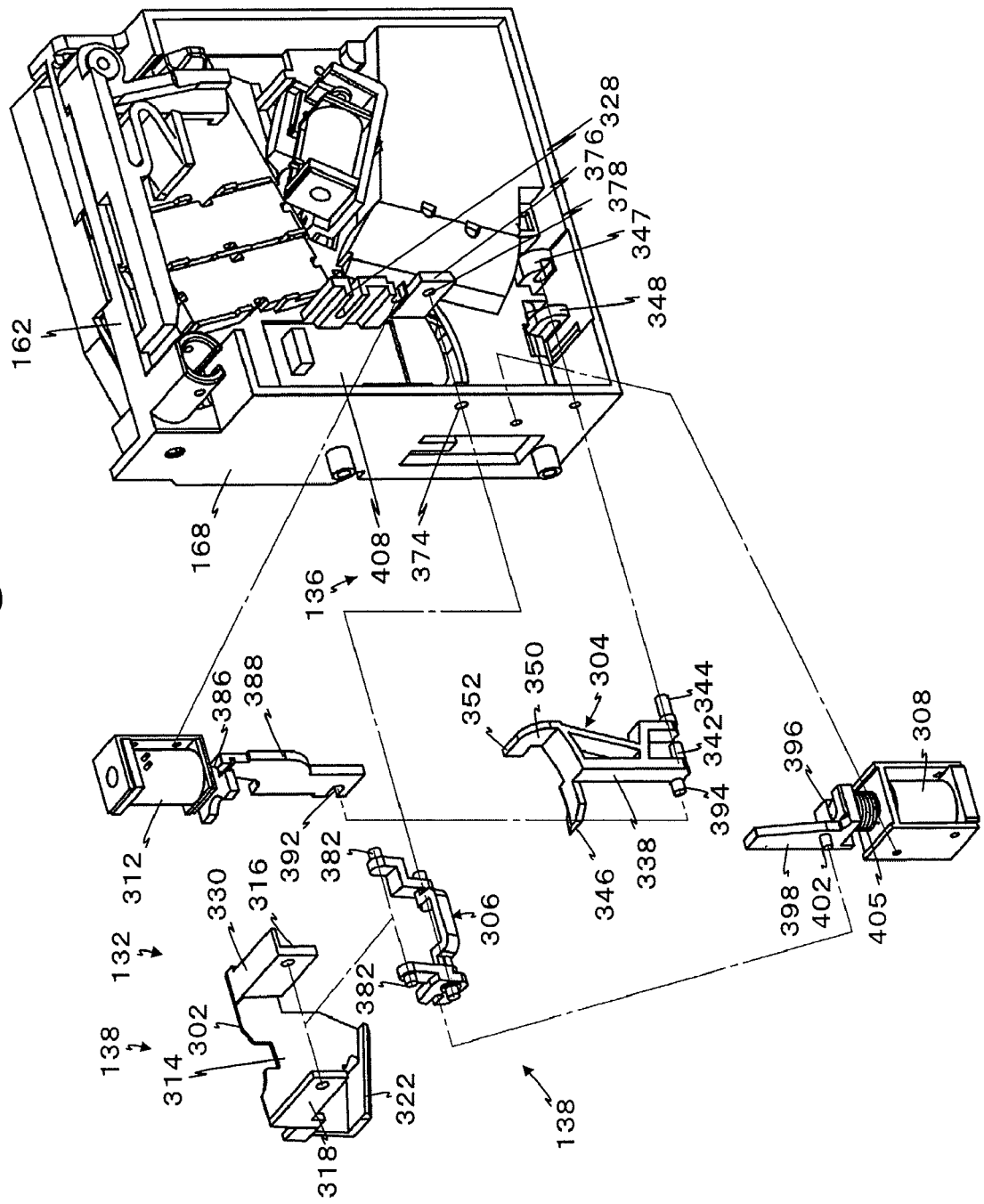
FIG. 7 is an exploded perspective view of an IC coin reservoir of the value medium processing apparatus according to the embodiment.

The communicator 136 is explained below with reference to FIGS. 2 and 7. The communicator 136 communicates value information with the IC chip 104 of the IC coin 100 reserved in the IC coin reservoir 132, and reads and writes the value information. In the present embodiment, the communicator 136 is a communication board 408, which is fixed to the rear surface of the base plate 162 in the recess 326 and is provided with an IC having a communication function and an antenna. Since the communication board 408 is capable of communicating with the IC coin 100 rolling on the medium common rolling path 116 in the present embodiment, the communication board 408 communicates with the IC coin 100 while the coin rolls on the medium common rolling path 116, reads out an individually set ID, and determines whether the IC coin 100 is true or false. When it is determined that the IC coin 100 is true, the IC coin reservoir 132 reserves the IC coin 100; when it is determined that the IC coin 100 is false, the IC coin reservoir 132 does not reserve the coin and the return sorter 146 drops the coin to the return path 148. When the IC coin 100 is determined based on the ring 106, the coin may be reserved in the IC coin reservoir 132 as described above, and then sorted by the IC coin sorter 138 (described hereinafter) to the IC coin storage path 142 or the return path 148.

The IC coin sorter 138 is explained below with reference to FIGS. 7 and 14A to 14C. The IC coin sorter 138 guides the IC coin 100 reserved in the IC coin reservoir 132 to the IC coin storage path 142 or the return path 148. The IC coin sorter 138 includes the storage guide member 302 and the return guide member 304; the link member 306; the third electromagnetic actuator 308; and the fourth electromagnetic actuator 312. In other words, the IC coin sorter 138 also serves as the IC coin reservoir 132.

When the fourth electromagnetic actuator 312 is magnetized in the standby position SP3 in FIGS. 14A to 14C, the return guide member 304 is rotatably moved counterclockwise from a state in FIGS. 14A to 14C, and the stopper projection 352 is disengaged from a side of the reserved IC coin 100 (a state shown in FIGS. 15A to 15C). Since the holding storage rail 322 is inclined toward the right side plate 166, the IC coin 100 rolls in an inclined direction by gravity, and rolls toward the IC coin storage path 142. Then, an upper portion of the IC coin 100 passes through the storage groove 340, and the IC coin 100 rolls to the IC coin storage path 142 so as to be stored.

A case in which the reserved IC coin 100 is guided to the return path 148 is explained below. The third electromagnetic actuator 308 is first magnetized, and the link piece 398 is moved downward. Thereby, the swing members 368 are rotatably moved clockwise from a state in FIGS. 14A to 14C. Then, as shown in FIGS. 16A to 16C, the guide holding wall 314 is moved to the reserve position RP. In other words, the IC coin reserve chamber 407 is positioned below the IC coin path inlet 124. In this state, the IC coin 100 is placed on the mount portion 354; and the guided stay 316 and the storage guide projection 358 are stopped from rotating by left and right peripheries provided on sides of the IC coin reserve chamber 407, and are held by the IC coin reserve chamber 407.

Subsequently, the fourth electromagnetic actuator 312 is magnetized, and then the link piece 388 is pulled up. Thereby, the return guide member 304 is rotatably moved counterclockwise from a state in FIGS. 16A to 16C; and the storage guide projection 358 is shifted laterally from the holding storage rail 322, and thus apart for an amount greater than the thickness of the IC coin 100 (a state shown in FIGS. 17A to 17C). Since the reserved IC coin 100 placed on the mount portion 354 is prevented from moving by the wall surface of the reserve recess 324, the IC coin 100 is dropped to the return path 148 below when the mount portion 354 is disengaged from below, and then is returned.

Figure 3:
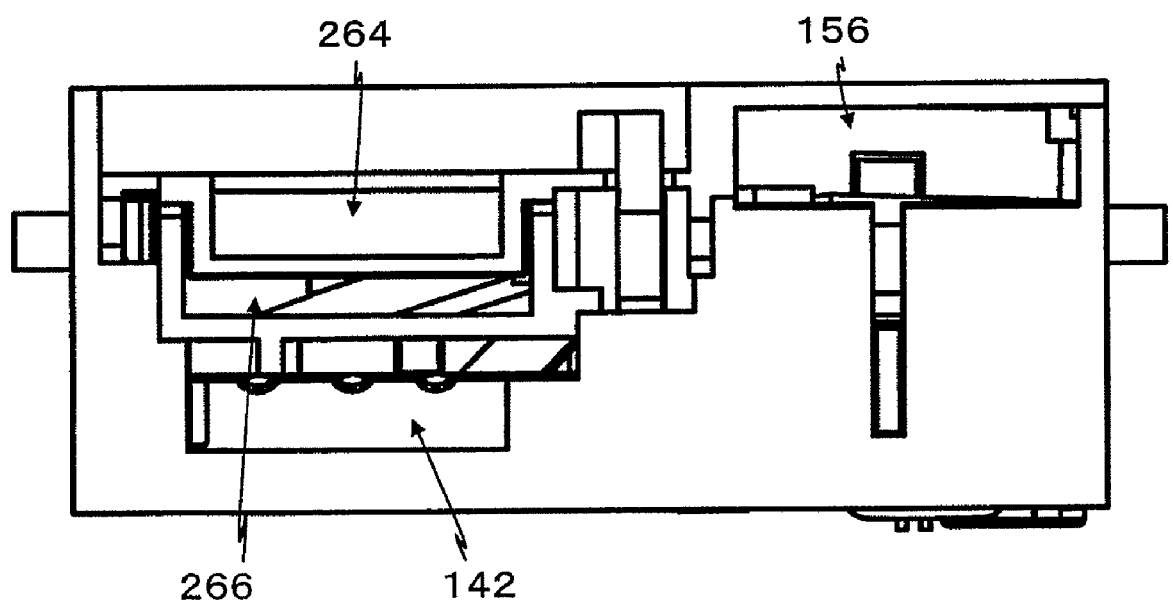
FIG. 3 is a bottom view of the value medium processing apparatus according to the embodiment.

The IC coin storage path 142 is explained below with reference to FIG. 8. The IC coin storage path 142 guides the IC coin 100 reserved in the IC coin reservoir 132 to a storage (not shown in the drawing). The IC coin storage path 142 is demarcated by the base plate 162, the intermediate plate 125, and the first partition wall 268; and is provided in parallel with the coin path 122. As shown in FIG. 3, an outlet of the IC coin storage path 142 is provided on a lower surface of the value medium processing apparatus 112 and in parallel with the second coin storage path 266 and the first coin storage path 264.

The return path 148 is explained below. The return path 148 guides the coin C, a false coin, the IC coin 100, and a false IC coin to the lower outlet 156 on the lower surface. In the present embodiment, the return path 148 is a path vertically extending below the turning path 214, and demarcated by the base plate 162, the right side plate 168, and the side cover 224. A guide surface 414 at the lower portion of the base plate 162 is inclined so as to guide a dropped IC coin 100 in a lateral direction toward the lower outlet 156. It is also possible to guide the coin to a second return outlet 416 provided on the right side plate 168, by providing a guide plate (not shown in the drawing) to the return path 148.

Figure 4:
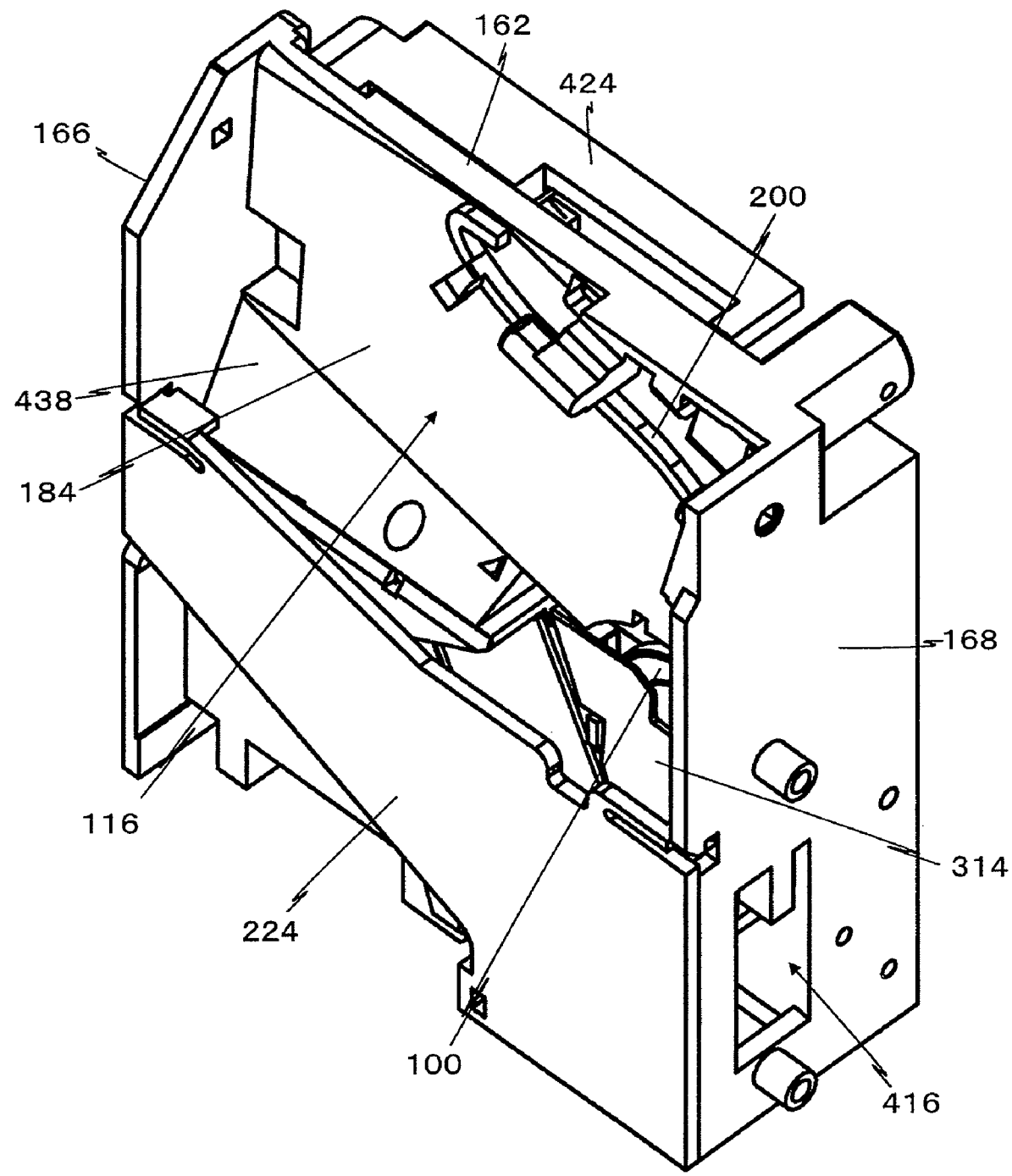
FIG. 4 is a perspective view of the value medium processing apparatus according to the embodiment when a door plate is removed.

A canceller 422 is explained below with reference to FIGS. 1, 2, and 4. The canceller 422 cancels and returns the coin C or the IC coin jammed on the medium common rolling path 116 to the return outlet 152. In the present embodiment, the canceller 422 includes the door plate 164, a cancel lever 424, and a cam bar 427.

The cancel lever 424 is first explained. The cancel lever 424 is an L-shaped lever to be operated by a customer to cancel the coin C. The cancel lever 424 is rotatably mounted to a fixing shaft 425 at a middle portion thereof, the fixing shaft 425 laterally projecting from the upper rear surface of the base plate 162. A lever 426 extending below the cancel lever 224 extends downward substantially in parallel with the left side plate 166. The cancel lever 424 is provided so as to be pushed down through a link mechanism according to a customer's operation. Further, the cancel lever 424 is biased clockwise in FIG. 2, by a spring 428 extending downward having a Z shape from a middle region thereof.

The cam bar 427 is explained below. The cam bar 427 extends from the rear surface of the door plate 164 and penetrates an aperture 432 of the base plate 162. A cam surface 434, which is an inclined surface, is provided at an end portion of the cam bar 427. When the cancel lever 424 is rotatably moved counterclockwise in FIG. 2, the lever 426 is rotatably moved in the same direction. Then, the cam surface 434 is pushed to exert a lateral force to the cam bar 427. Thus, the lower end portion of the door plate 164 is moved to be disengaged from the base plate 162. Thereby, a gap between the turning guide rail 182 and the main body upper wall surface 184 is opened for an amount greater than a maximum thickness of used coins and the like. A jammed coin C and the like on the medium common rolling path 116 are guided by an inclined guide surface 438 extending from the upper guide wall 184 and dropped to the cancel path toward the lower outlet 156.

A pass sensor 442 is explained below with reference to FIGS. 2, 5, and 8. The pass sensor 442 detects that media, namely the IC coin 100 and the coin C, have passed through the IC coin storage path 142 and the coin storage path 152, respectively. The pass sensor 442 detects that the coin C or the IC coin 100 has passed between the coin sorting body 236 and the denomination sorting body 276. The pass sensor 442 includes a light projector 444, light receiver 446, and a light guide 448. The light projector 444 and the light receiver 446 are fixed to the rear surface of the base plate 162. The light guide 448 is fixed to the side cover 224.

A projected light from the light projector 444 passes through the IC coin storage path 142 and the coin storage path 152 in the order; enters the light guide 448 from a receiving surface; is turned 180 degrees; is projected from a projecting surface; passes through the coin storage path 152 and the IC coin storage path 142 in the order; and enters the light receiver 446. Thus, when the IC coin 100 passes through the IC coin storage path 142, or when the coin C passes through the coin storage path 152, the projected light is blocked for a predetermined time. The light receiver 446 detects the blocking and outputs a pass signal PS. Based on the pass signal PS, the first electromagnetic actuator 233 is demagnetized, and the coin sorting body 236 is returned to the cancel position CP. Portions are opened through which the projected light passes in the base plate 162, the side cover 224, and the intermediate plate 215.

The controller 154 is explained below. The controller 154 magnetizes and demagnetizes the first electromagnetic actuator 233, the second electromagnetic actuator 266, the third electromagnetic actuator 308, and the fourth electromagnetic actuator 312, at an appropriate timing based on coin authenticity and a denomination signal from the coin determination circuit 212 and on communication with the IC chip 104 of the IC coin 100 via the communicator 136. The controller 154 includes a microprocessor 452. According to predetermined programs stored in a ROM, the microprocessor 452 magnetizes and demagnetizes the first electromagnetic actuator 233 and the like following predetermined procedures, based on signals from the coin determination circuit 212, the communicator 136, and the pass sensor 442.

It is preferable that a suspension stopper 454 be provided to the turning path 214. The suspension stopper 454 of the present embodiment is a stopper body 458 swingably attached to a support shaft 456 laterally provided to the door plate 164. Normally, a moment is exerted to the stopper body 458 due to gravity, such that a lower end portion thereof proceeds toward the turning path 214, pivoting on the support shaft 456. Thus, the lower end of the stopper body 458 passes through a cutout 462 of the guide holding wall 314 and stands still in contact with the wall of the reserve recess 324. In other words, the lower end portion of the stopper body 458 intersects the turning path 214. An upper surface of the lower end portion of the stopper body 458 is inclined downward toward the wall of the reserve recess 326.

When the coin C passes through the turning path 214, the coin C presses and moves the inclined surface of the stopper body 458, so as to pass therethrough. After the coin C passes, the stopper body 458 returns to an original position by a moment of its own. When the IC coin 100 is reserved in the IC coin reservoir 132, the stopper body 458 continues to be in contact with a side surface of the IC coin 100. After the IC coin 100 rolls to the IC coin storage path 142, however, the stopper body 458 returns to the original position by the moment of its own. When the suspended coin C or IC coin 100 is pulled up, the downwardly inclined surface of the stopper body 458 is pressed by the coin C or the IC coin 100, and thus the stopper body 458 is pressed against the wall of the reserve recess 326. Thereby, the coin C and the IC coin 100 are prevented from moving by the stopper body 458, and cannot be pulled up.

A coin inserted into the coin inlet provided on a surface of a body of a vending machine can be guided through a chute to the insert 114, for example.

Operations of the present embodiment are explained below. A case where a true coin C, except a 500 yen (or other high-value) coin, is inserted is explained first. When the value medium processing apparatus 112 is in standby mode, the first through fourth electromagnetic actuators 233, 266, 308, and 312 are demagnetized. Thereby, the IC coin reservoir 132 is positioned in the standby position SP3. More specifically, the iron core 396 of the third electromagnetic actuator 308 is projected; the storage guide member 302 is thus retracted into the reserve recess 324 via the driving pin 402, the swing members 368, and the pin 382; and thereby the storage guide member 302 is positioned in the standby position SP3. Further, the iron core of the fourth electromagnetic actuator 312 is projected downward; the return guide member 304 is thus rotatably moved counterclockwise via the link piece 388 and the pin 394; and thereby the return guide member 304 is also positioned in the standby position SP3.

Accordingly, the coin path 122 is connected to the media common rolling path 116, and the IC coin path inlet 124 is closed. The iron core 280 of the first electromagnetic actuator 233 is projected by the spring (not shown in the drawing); the driven pin 252 is moved further left from the solid line position in FIG. 9; and the coin sorting body 236 is held at the cancel position CP indicated with the solid line in FIG. 8, via the first link mechanism 242. Further, the iron core 288 of the second electromagnetic actuator 277 is projected by the spring (not shown in the drawing); and the denomination sorting body 276 is positioned at the second storage position SP2 indicated with the dotted line, via the second link mechanism 282. In other words, the media common rolling path 116 is linked to the second coin storage path 266 via the turning path 214, the coin path 122, and the coin storage path 152.

When a false coin FC is inserted into the inlet 114 in this state, the false coin FC vertically drops along the drooping path 198 for a substantially diameter amount, and then rolls on the rolling guide rail 182 to the right in FIG. 5. While rolling, the coin is sequentially opposed to the first coil sensor 206 and the second coil sensor 208, and thereby characteristic information related to the material, diameter, and thickness is obtained. The coin determination circuit 212 determines authenticity by comparing the characteristic information against reference information. Since the false coin FC is inserted in the present embodiment, the coin determination circuit 212 outputs a false coin signal FS to the controller 154. Further, since the false coin FC does not communicate with the communicator 136, the controller 154 determines that the coin is not the IC coin 100.

Since receiving the false coin signal FS in Step S1, the controller 154 proceeds to Step S2. The coin is not determined in Step S2 as a true IC coin 100, either, and thus the process returns to Step S1. Accordingly, the first to fourth electromagnetic actuators 233, 266, 308, and 312 are not magnetized. Thus, the false coin FC is dropped from the inclined path 204 to the turning path 214, and then guided by the side wall 228 of the guide holding wall 314 so as to pass through the turning path 214. The false coin FC dropped to the turning path 214 is dropped on the turning guide rail 232 and turned to the left in FIG. 5, so as to reach the coin path 122. After slightly rolling on the coin path guide rail 218, the false coin FC is guided by the coin sorting body 236 of the return sorter 146, deflected from the coin path guide rail 218 to the side, and dropped to the returning path 148. The false coin FC dropped to the return path 148 is guided by the inclined guide surface 414 so as to be dropped from the lower outlet 156, and returned by a predetermined chute to a return outlet (not shown in the drawing) of an internal device.

A case where a true coin C, which is a 10 yen, 50 yen, or 100 yen (or other lower-value) coin, is inserted is explained next. As explained above, while the true coin C rolls on the rolling guide rail 182 of the medium common rolling path 116, the first coin sensor 206 and the second coin sensor 208 obtain the characteristic information. Based on the characteristic information, the coin determination circuit 212 determines the authenticity and denomination of the coin, and outputs to the controller 154 a true coin signal TS and a denomination signal DS. Since no communication is performed through the communicator 136 in this case, either, the third electromagnetic actuator 308 remains demagnetized.

When the controller 154 detects the true coin signal TS in Step S1, the process proceeds to Step S3. In Step S3, the first electromagnetic actuator 233 is magnetized and the process proceeds to Step S4. It is determined in Step S4 whether the denomination signal DS is 500 yen (or other high-value). When the denomination signal DS is not 500 yen (or other high-value), the process proceeds to Step S5. In other words, the controller 154 does not magnetize the second electromagnetic actuator 266. Thereby, the denomination sorting body 276 keeps the inlet to the first coin storage path 264 closed, and thus the true coin C is guided to the second coin storage path 266 and then to a storage linked to the second coin storage path 266.

In Step S5, it is determined whether the pass signal PS is output from the pass sensor 442. When it is determined that the pass signal PS is output, the process proceeds to Step S6. Specifically, when the true coin C is guided by the coin sorting body 236 and the denomination sorting body 276 so as to roll to the second coin storage path 266, the projected light from the light projector 444 is blocked by the true coin C for a predetermined time, and received by the light receiver 446 again after the light is not received for the predetermined time. Detecting the resumption of light reception, the pass sensor 442 outputs the pass signal PS. Thereby, it is presumably confirmed that the true coin C is stored in the 10 yen to 100 (or other lower-value) yen coin storage.

After the first electromagnetic actuator 233 is demagnetized in Step S6, the process returns to Step S1. Demagnetizing the first electromagnetic actuator 233 returns the coin sorting body 236 to the cancel position CP to be ready for a next insertion.

A case where a 500 yen (or other high-value) coin is inserted is explained below. Since the flow through Step S4 is the same as described above, processes after Step S7 are explained. After the second electromagnetic actuator 266 is magnetized in Step S7, the process proceeds to Step S8. Magnetizing the second electromagnetic actuator 266 projects the iron core and moves the denomination sorting body 276 to the first position FP indicated with the solid line in FIG. 8. Thereby, the 500 coin rolling on the coin storage path 152 is guided by the denomination sorting body 276 to the first coin storage path 264, and stored in a 500 yen (or other high-value) coin storage (not shown in the drawing).

After it is determined in Step S8 that the pass signal PS is output from the pass sensor 442, the process proceeds to Step S9. It is presumably confirmed with the pass signal PS that the true 500 yen coin is stored in the storage.

After the first electromagnetic actuator 233 is demagnetized in Step S9, the process proceeds to Step S10. Demagnetizing the first electromagnetic actuator 233 moves the coin sorting body 236 to the second position CP2.

After the second electromagnetic actuator 266 is demagnetized in Step S10, the process returns to Step S1. Demagnetizing the second electromagnetic actuator 266 moves the denomination sorting body 276 to the second position SP2 to be ready for a next insertion.

A case where the IC coin 100 is inserted is explained below. Since the IC coin 100 is different from the coin C, the coin determination circuit 212, based on the characteristic information from the first coin sensor 206 and the second coin sensor 208, outputs the false coin signal FS, without outputting the true coin signal TS. Thus, the process proceeds from Step S1 to Step S2.

Meanwhile, while the IC coin 100 rolls on the medium common rolling path 116, the communicator 136 communicates with the IC chip 104 of the IC coin 100, and the controller 154 reads out an ID individually set to the IC chip 104 and determines authenticity. When it is determined as a false IC coin, the process returns to Step S1. Accordingly, the first electromagnetic actuator 233, the second electromagnetic actuator 266, the third electromagnetic actuator 308, and the fourth electromagnetic actuator 312 remain demagnetized. Thus, similar to the false coin FC, the false IC coin rolls from the turning path 232 to the coin path 122, and then is dropped by the coin sorting body 236 to the return path 148 and returned to the lower outlet 156.

A case where a true IC coin 100 is inserted is explained below. While the IC coin 100 rolls on the medium common rolling path 116, the communicator 136 communicates with the IC chip 104, and the controller 154 determines the coin as a true IC coin 100. Thus, the process proceeds from Step S2 to Step S11.

After the third electromagnetic actuator 308 is magnetized in Sep S11, the process proceeds to Step S12. Magnetizing the third electromagnetic actuator 308 moves the storage guide member 302 to the turning path 214 at the reserve position RP. Specifically, since the holding storage rail 322 is positioned on the turning path 204, and the stopper projection 352 is positioned on the side of the holding storage rail 322, as shown in FIGS. 16A to 16C, the IC coin reserve chamber 407, which is formed by the storage guide member 302 and the return guide member 304, is positioned on the turning path 214.

After a sufficient time to receive the IC coin 100 is counted in Step S12, the process proceeds to Step S13. Thereby, the true coin IC 100 dropped from the inclined path 204 is reserved in the IC coin reserve chamber 407.

The third electromagnetic actuator 308 is demagnetized in Step S13, and the process proceeds to Step S14. Demagnetizing the third electromagnetic actuator 308 returns the storage guide member 302 to the standby position SP3 shown in FIGS. 14A to 14C. Thereby, the IC coin 100 continues to be reserved in the IC coin reserve chamber 407. When a new coin C is inserted in this state, the coin C can move on the turning path 144, and then be stored or returned as described above. When a true IC coin 100 is inserted, the IC coin 100 is not reserved, since the previous IC coin has already been reserved in the IC coin reserve chamber 407, and then returned to the lower outlet 156, similar to the false IC coin described above.

In the state where the IC coin 100 is reserved in the IC coin reserve chamber 407, communication is performed with the IC chip 104 via the communicator 136, and value information stored in the IC chip 104 is processed. For instance, data associated with a product value is subtracted, and the balance is stored. When the balance is zero, the controller 154 outputs a storage signal in order to store the IC coin 100. When the storage signal is detected in Step 14, the process proceeds to Step S15.

After the fourth electromagnetic actuator 312 is demagnetized in Step S15, the process proceeds to Step S16. Demagnetizing the fourth electromagnetic actuator 312 rotatably moves the return guide member 304 counterclockwise from the state in FIGS. 14A to 14C, and disengages the stopper projection 352 from the side of the holding storage rail 322 (FIGS. 15A to 15C). When the stopper projection 352 is moved, the side wall is removed from the IC coin storage path 142 side of the IC coin reserve chamber 407. Thereby, the IC coin 100 starts to roll down due to inclination of the holding storage rail 322 and gravity, passes through the storage groove 340, rolls to the IC coin storage path 142, and is stored in an IC coin storage (not shown in the drawing).

After the pass signal PS from the pass sensor 442 is detected in Step S16, the process proceeds to Step S17. It is presumably confirmed with the pass signal PS from the pass sensor 442 that the IC coin 100 is stored.

After the fourth electromagnetic actuator 312 is demagnetized in Step S17, the process returns to Step S1. Demagnetizing the fourth electromagnetic actuator 312 returns the return guide member 304 to Status j in FIGS. 14A to 14C, and in the standby mode.

A case where the balance of the IC coin 100 is not zero is explained below. In this case, the controller 154 outputs a return signal, and the IC coin 100 is returned to the lower outlet 156. When the return signal is detected in Step S14, the process proceeds to Step S18.

After the third electromagnetic actuator 308 is magnetized in Step S18, the process proceeds to Step S19. Magnetizing the third electromagnetic actuator 308 projects the storage guide member 302 to the turning path 214. In this state, the IC coin 100 is stopped and continuously held by the stopper projection 352 positioned on the side of the IC coin reserve chamber 407 (the status shown in FIGS. 16A to 16C).

After a predetermined time is counted in Step S19, the process proceeds to Step S20. The counted time is short and intended to generate a time lag in order to prevent the next process of Step S20 from preceding the process of Step S18.

After the fourth electromagnetic actuator 312 is demagnetized in Step S20, the process proceeds to Step S21. Demagnetizing the fourth electromagnetic actuator 312 rotatably moves the return guide member 304 counterclockwise from the state of FIGS. 16A to 16C (the state of FIGS. 17A to 17C). Thereby, the storage projection 358 is moved apart from the holding storage rail 322 laterally from above for an amount greater than the thickness of the IC coin 100. Concurrently, the horizontal portion 354 is moved below the base plate 162. Thereby, an aperture is formed at the bottom of the IC coin reserve chamber 407, and thus the IC coin 100 is dropped through the aperture to the return path 414 below and then returned through the lower outlet 156.

After a predetermined time is counted in Step S21, the process proceeds to Step S22. The predetermined time in Step S21 is a time sufficient for the IC coin 100 in the IC coin reserve chamber 407 to drop.

After the third electromagnetic actuator 308 is demagnetized in Step S22, the process proceeds to Step S23. Demagnetizing the third electromagnetic actuator 308 returns the storage guide member 302 to the standby position.

After the fourth electromagnetic actuator 312 is demagnetized in Step S23, the process proceeds to Step S1. Thereby, the return guide member 304 is also returned to the standby position to be ready for a next insertion.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A value medium processing apparatus for determining authenticity of at least one of a coin and a generally coin-shaped electric value storage medium (IC coin) inserted into a common inlet so as to sort the coins into a received coin and a returned coin, and communicating with the IC coin so as to sort the IC coin into a received IC coin and a returned IC coin, the value medium processing apparatus comprising:

a common rolling path on which the IC coin and the coin are configured to roll, the common rolling path extending from the inlet, and comprising a drooping path extending generally perpendicularly downward from the inlet, and an inclined path extending obliquely downward from the drooping path;

a coin characteristic detector provided on a side portion of the common rolling path;

a coin inlet to a coin path on which the coin rolls, and an IC coin inlet to an IC coin path on which the IC coin rolls, the coin inlet and the IC coin inlet extending from the common rolling path;

a medium sorter provided at the coin inlet and the IC coin inlet;

a turning path extending from the inclined path so as to turn the coin to a direction opposite to the inclination;

the coin path extending from the turning path and obliquely downward in a direction opposite to the inclination at a lower portion of the common rolling path;

the medium sorter provided on the turning path;

an IC coin reservoir;

the IC coin reservoir and the medium sorter include a storage guide member and a return guide member which are integrally and/or independently movable;

the storage guide member and the return guide member can be positioned at a standby position contiguous to the coin path or at a reserve position downstream of the common rolling path;

the storage guide member and the return guide member construct an IC coin reserve chamber being surrounded by a guide holding wall and the side wall of a recess on a side surface, by the holding storage rail of a lower surface, and by a stopper projection and a guided stay on a side periphery;

the IC coin reservoir can be horizontally moved to the reserve position; and the storage guide member and the return guide member can be individually moved at the reserve position;

a communicator configured to communicate with the IC coin reserved in the IC coin reservoir;

an IC coin sorter;

an IC coin storage path and a return path;

a return sorter provided adjacent to the medium sorter;

a coin return path and a coin storage path; and a controller switching the medium sorter to one of the IC coin path and the coin path, based on one of characteristic information from the coin characteristic detector and information from the communicator.

2. A value medium processing apparatus for determining authenticity of at least one of a coin and a generally coin-shaped electric value storage medium (IC coin) inserted into a common inlet so as to sort the coins into a received coin and a returned coin, and communicating with the IC coin so as to sort the IC coin into a received IC coin and a returned IC coin, the value medium processing apparatus comprising:

a common rolling path on which the IC coin and the coin are configured to roll, the common rolling path extending from the inlet, and comprising a drooping path extending generally perpendicularly downward from the inlet, and an inclined path extending obliquely downward from the drooping path;

a coin characteristic detector provided on a side portion of the common rolling path;

a coin inlet to a coin path on which the coin rolls, and an IC coin inlet to an IC coin path on which the IC coin rolls, the coin inlet and the IC coin inlet extending from the common rolling path;

an IC coin reservoir;

a medium sorter provided at the coin inlet and the IC coin inlet;

a communicator configured to communicate with the IC coin reserved in the IC coin reservoir;

an IC coin sorter;

an IC coin storage path and a return path;

a return sorter;

a coin return path and a coin storage path provided; and a controller switching the medium sorter to one of the IC coin path and the coin path, based on one of characteristic information from the coin characteristic detector and information from the communicator; wherein:

a turning path is provided extending from the inclined path so as to turn the coin to a direction opposite to the inclination;

the coin path is provided extending from the turning path and obliquely downward in a direction opposite to the inclination at a lower portion of the common rolling path;

the medium sorter is provided on the turning path;

the return sorter is provided adjacent to the medium sorter;

the IC coin reservoir and the medium sorter include a storage guide member and a return guide member which are integrally and/or independently movable;

the storage guide member and the return guide member can be positioned at a standby position contiguous to the coin path or at a reserve position downstream of the common rolling path;

the storage guide member and the return guide member construct an IC coin reserve chamber being surrounded by a guide holding wall and the side wall of a recess on a side surface, by the holding storage rail of a lower surface, and by a stopper projection and a guided stay on a side periphery;

the IC coin reservoir can be horizontally moved to the reserve position; and the storage guide member and the return guide member can be individually moved at the reserve position.

3. The value medium processing apparatus according to claim 1, wherein the medium sorter and the IC coin reservoir are integrally provided, and projected to the coin path so as to receive the IC coin, according to an instruction from the controller.

4. The value medium processing apparatus according to claim 3, wherein the IC coin reservoir is normally held at a standby position, at which a portion thereof demarcates a portion of the coin path; and only when receiving the IC coin, the IC coin reservoir is projected toward the coin path and returned to the standby position immediately thereafter.

5. The value medium processing apparatus according to claim 1, wherein a denomination sorter is provided adjacent to the return sorter.

6. The value medium processing apparatus according to claim 5, wherein the IC coin reservoir comprises the storage guide member and the return guide member, which collaborate to form the IC coin reservoir;

when the storage guide member is released from the collaboration, the IC coin is guided by the return guide member to the return path; and when the return guide member is released from the collaboration, the IC coin is guided by the storage guide member to the IC coin storage path.

7. The value medium processing apparatus according to claim 6, wherein the return path is linked to a lateral side outlet and a downward lower outlet.

8. The value medium processing apparatus according to claim 2, wherein the medium sorter and the IC coin reservoir are integrally provided, and projected to the coin path so as to receive the IC coin, according to an instruction from the controller.

* * * * *